(12) United States Patent
Messerly et al.

(10) Patent No.: US 8,798,422 B2
(45) Date of Patent: Aug. 5, 2014

(54) OPTICAL WAVEGUIDES HAVING FLATTENED HIGH ORDER MODES

(75) Inventors: Michael Joseph Messerly, Danville, CA (US); Raymond John Beach, Livermore, CA (US); John Edward Heebner, Livermore, CA (US); Jay Walter Dawson, Livermore, CA (US); Paul Henry Pax, Haward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 365 days.

(21) Appl. No.: 13/162,351

(22) Filed: Jun. 16, 2011

(65) Prior Publication Data

US 2012/0321260 A1    Dec. 20, 2012

(51) Int. Cl.
*G02B 6/036* (2006.01)
(52) U.S. Cl.
USPC .......................................... 385/127
(58) Field of Classification Search
None
See application file for complete search history.

(56) References Cited

PUBLICATIONS

Dawson, et al., "Large Flatened Mode Optical Fiber for Reduction on Non-linear Effects in Optical Fiber Lasers", Proc. SPIE, vol. 5335, 132-139 (2004).
Wang, et al., "Single-Mode Operations in the Large Flattened Mode Optical fiber Lasers and Amplifiers", J. Opt. A: Pure Appl. Opt., 11, 1-5, (2009).
Yeh, "Electromagnetic Propagation in Periodic Stratified Media. I. General Theory", J. Opt. Soc. of America, 67 (1977).
Zhao et al., "Designed Guidelines and Characteristics for a King of Four-Layer Large Flattened Mode Fibers", Optik, 119, 749-754 (2008).
Dawson et al., "Large Flattened Mode Optical Fiber for Reduction of Non-Linear Effects in Optical Fiber Lasers," Proc. of SPIE, vol. 5335, pp. 132-139, (2004).
Fini et al., "Natural Bend-Distortion Immunity of Higher-Order-Mode Large-Mode-Area Fibers," Optics Letters, vol. 32, No. 7, pp. 748-750, (2007).
Ghatak et al., "Design of Waveguide Refractive Index Profile to Obtain Flat Modal Field, " Proc. of SPIE, vol. 3666, pp. 40-44, (1999).
Kang et al., "Flat-Topped Beam Output from a Double-Clad Rectangular Dielectric Waveguide Laser with a high-Index Inner Cladding," Optics Communications, vol. 282, pp. 2407-2412, (2009).
Quimby et al., "Yb3+ Ring Doping in High-Order-Mode Fiber for High-Power 977-nm Lasers and Amplifiers," IEEE Journal of Selected Topics in quantum Electronics, vol. 15, No. 1, pp. 12-19, (2009).
Ramachandran et al., "Ultra-Large Effective-Area, Higher-Order Mode fibers: A new Strategy for High-Power Lasers," Journal of InterScience, pp. 429-448, (2008).
Stolen et al., Self-Phase-Modulation in Silica Optical Fibers, Physical Review A, vol. 17, No. 4, pp. 1448-1454, (1978).
Torruellas et al., "High Peak Power Ytterbium Doped Fiber Amplifiers," Proc. of SPIE, vol. 6102, pp. 1-7, (2006).
Ward et al., "Photonic Crystal Fiber Designs for Power Scaling of Single-Polarization Amplifiers," Proc. of SPIE, vol. 6453, pp. 1-9, (2007). Yeh, et al., "Electromagnetic Propagation in Periodic Stratified Media. I. General Theory," J. Opt. Soc. Am., vol. 67, pp. 423-438, (1977).
Zhao et al., "Design Guidelines and Characteristics of a Four-Layer Large Flattened Mode Fiber," Chinese Optics Letters, vol. 5, Supple., pp. S86-S88, (2007).

*Primary Examiner* — Jerry Rahll
(74) *Attorney, Agent, or Firm* — John P. Wooldridge

(57) ABSTRACT

A deterministic methodology is provided for designing optical fibers that support field-flattened, ring-like higher order modes. The effective and group indices of its modes can be tuned by adjusting the widths of the guide's field-flattened layers or the average index of certain groups of layers. The approach outlined here provides a path to designing fibers that simultaneously have large mode areas and large separations between the propagation constants of its modes.

26 Claims, 19 Drawing Sheets

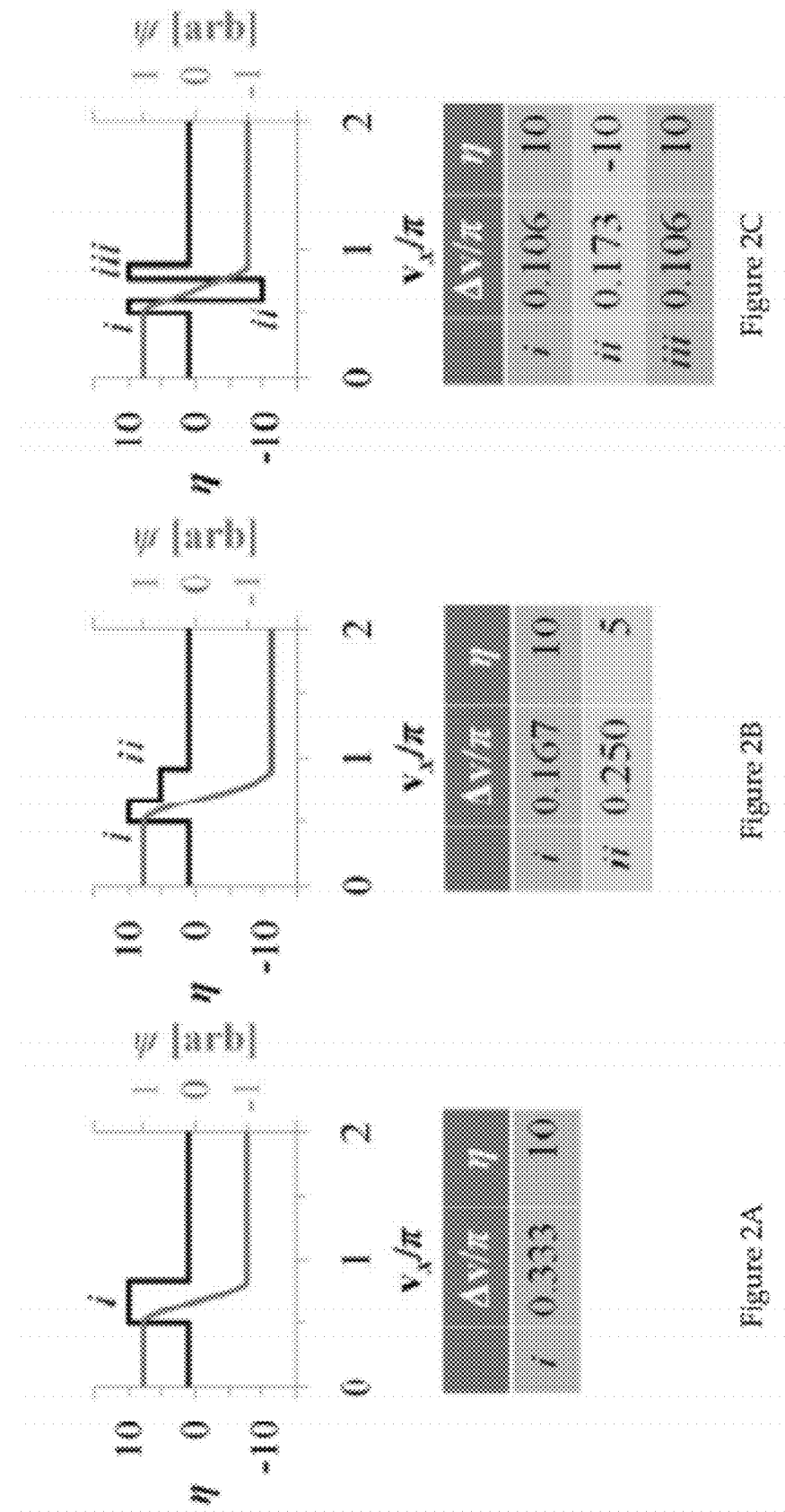

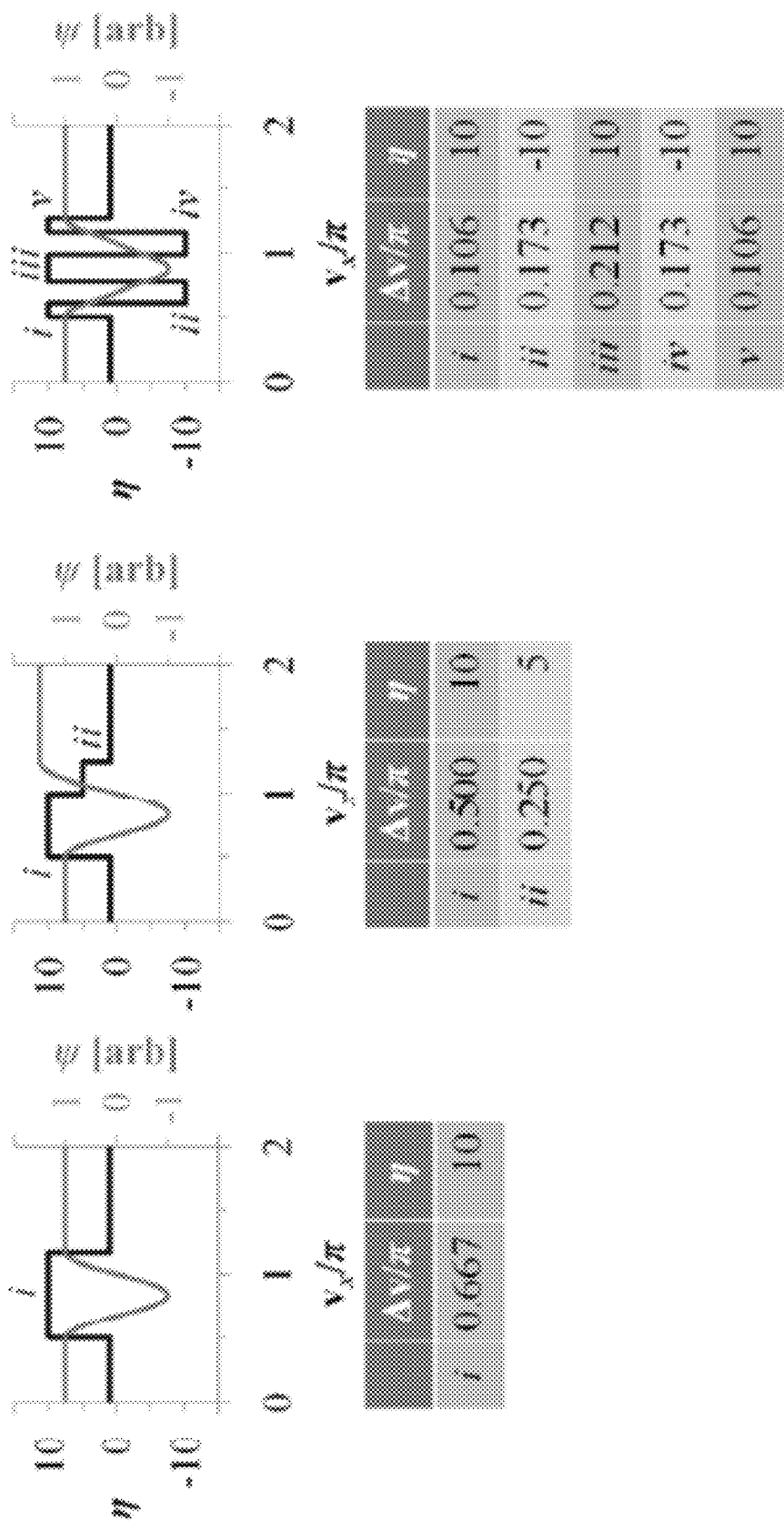

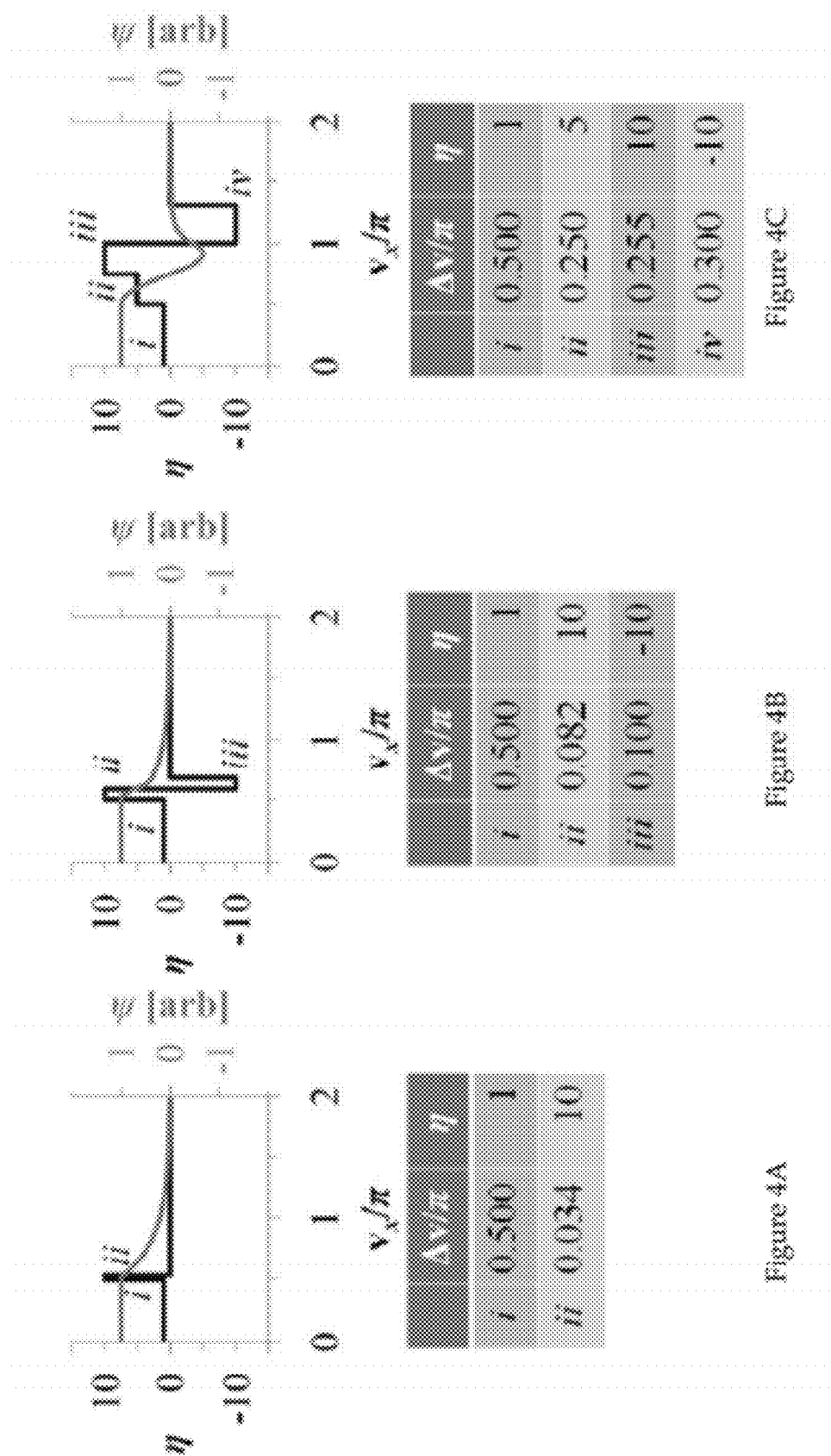

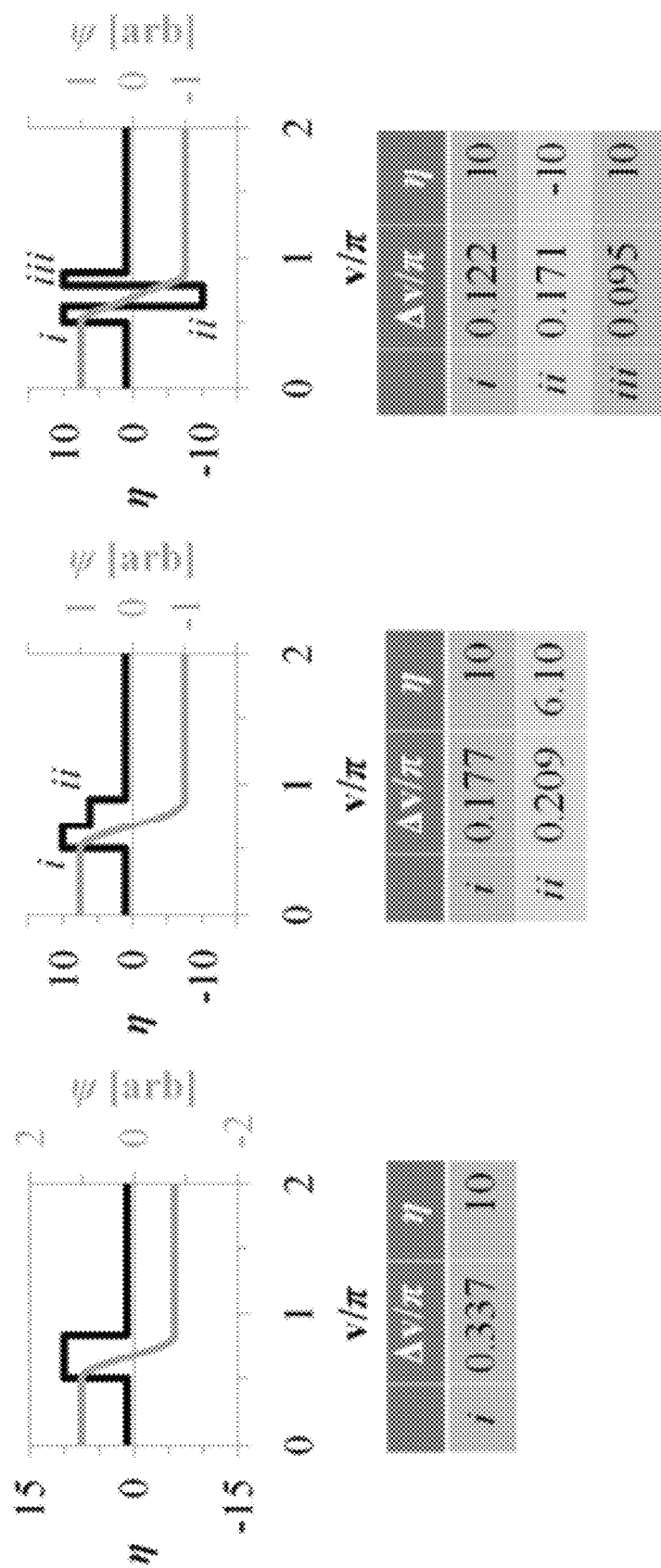

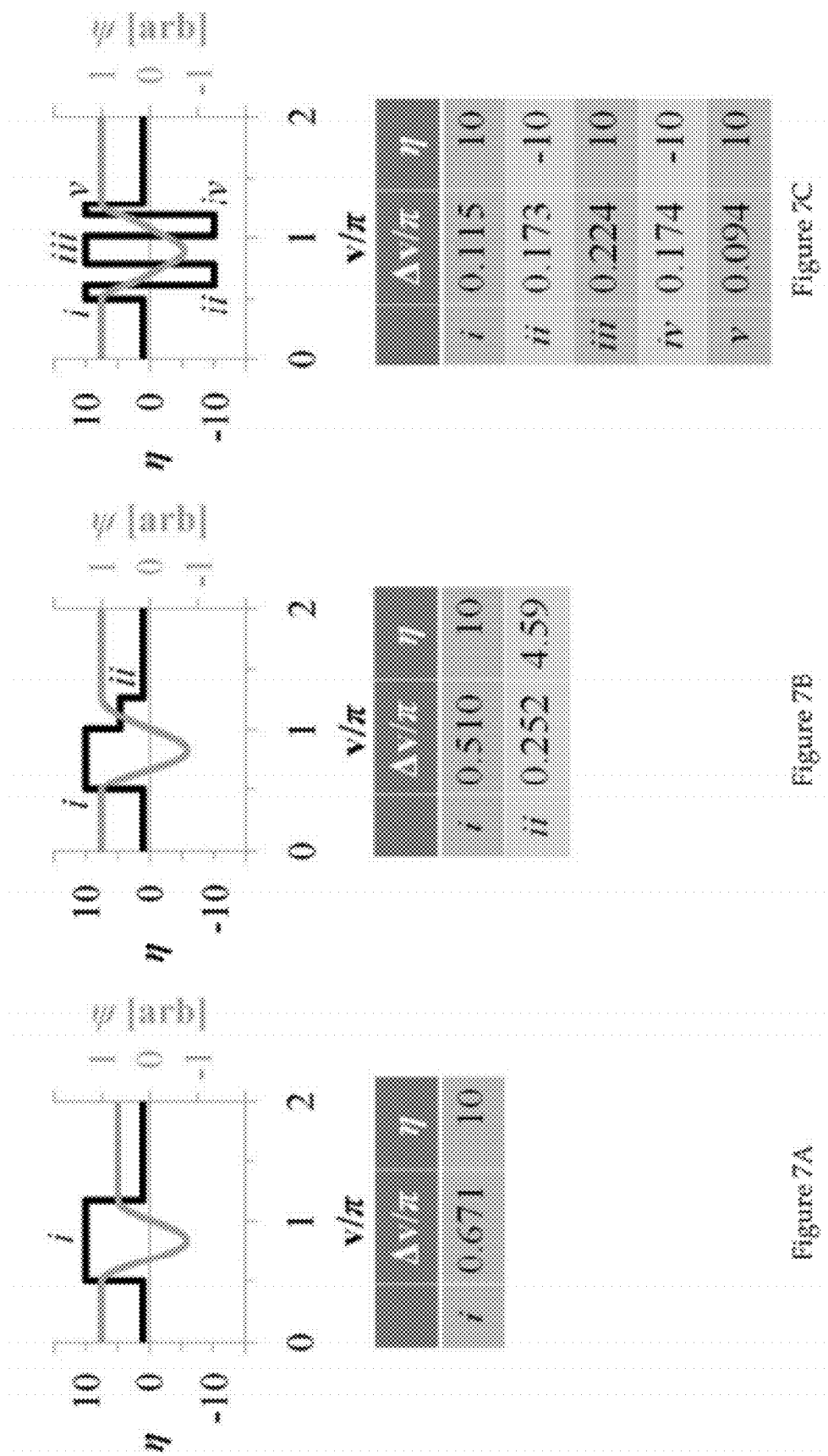

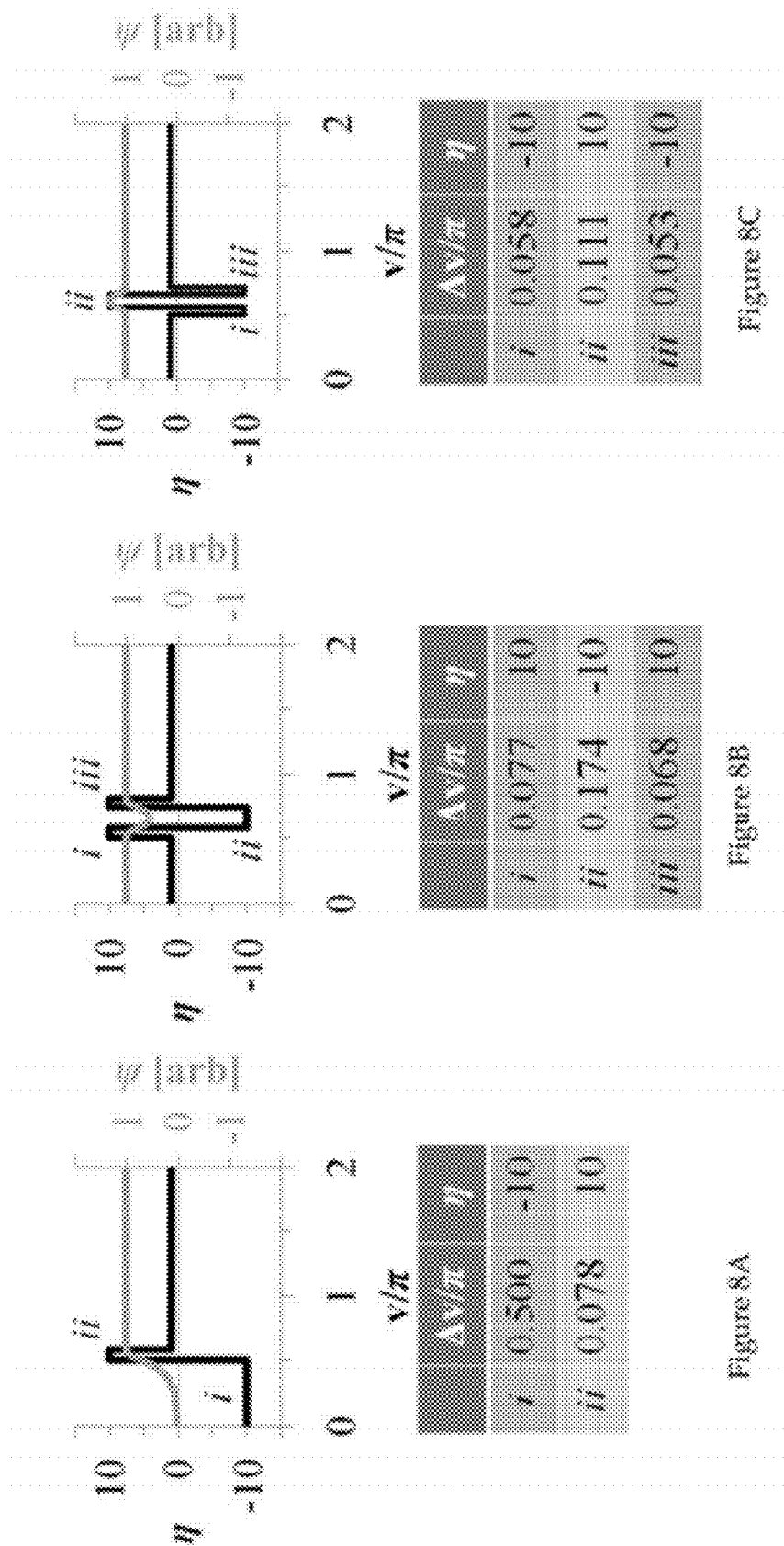

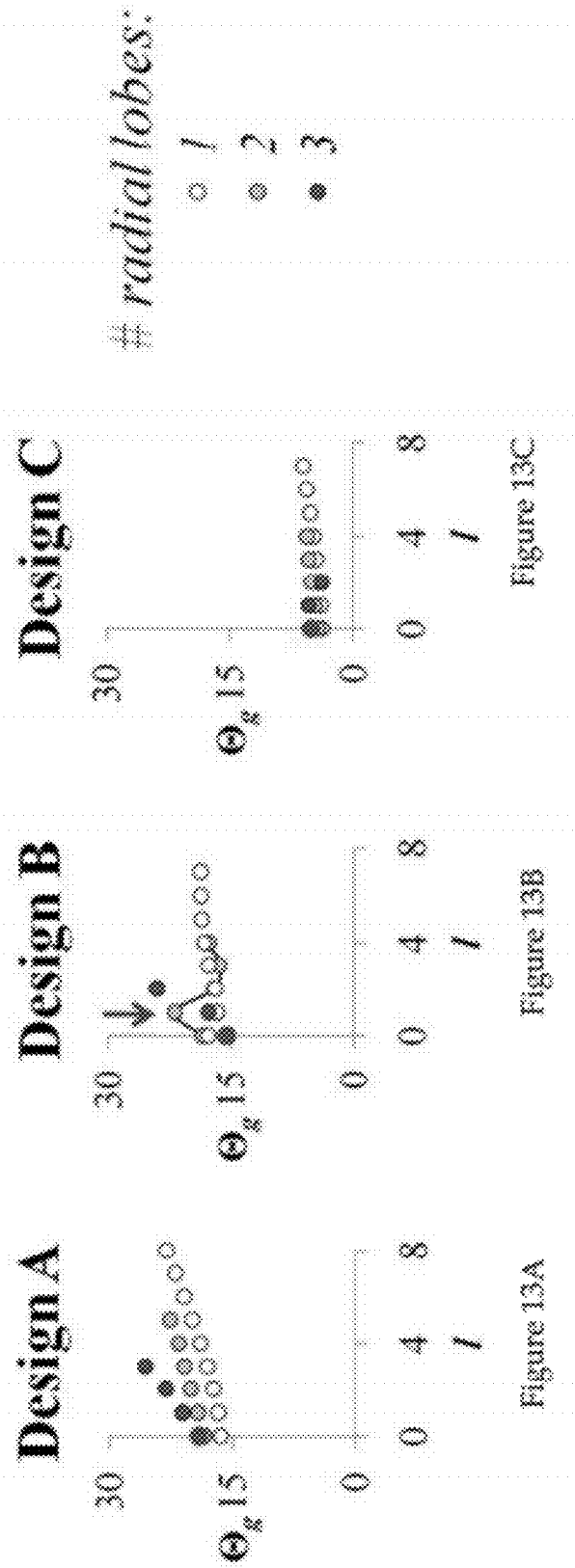

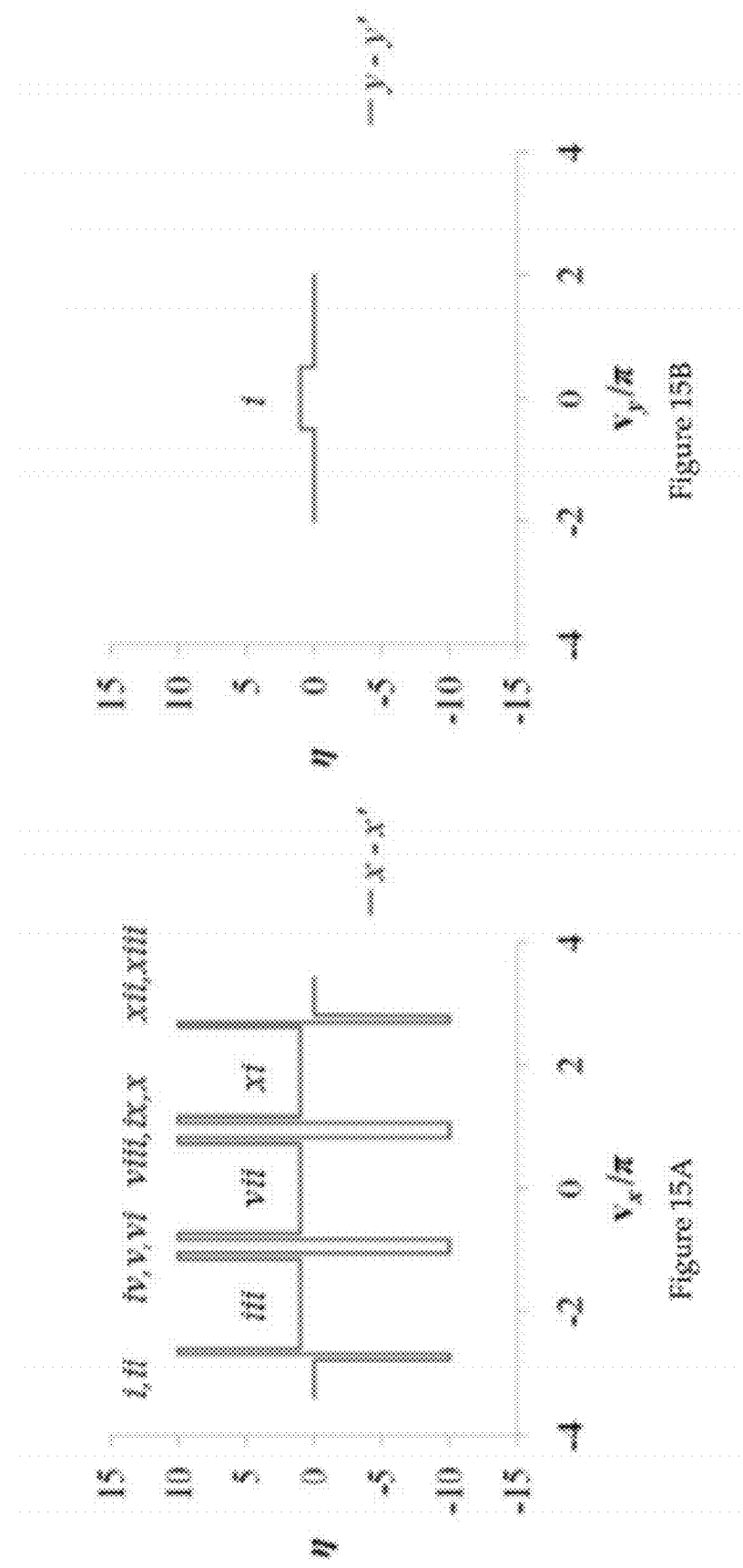

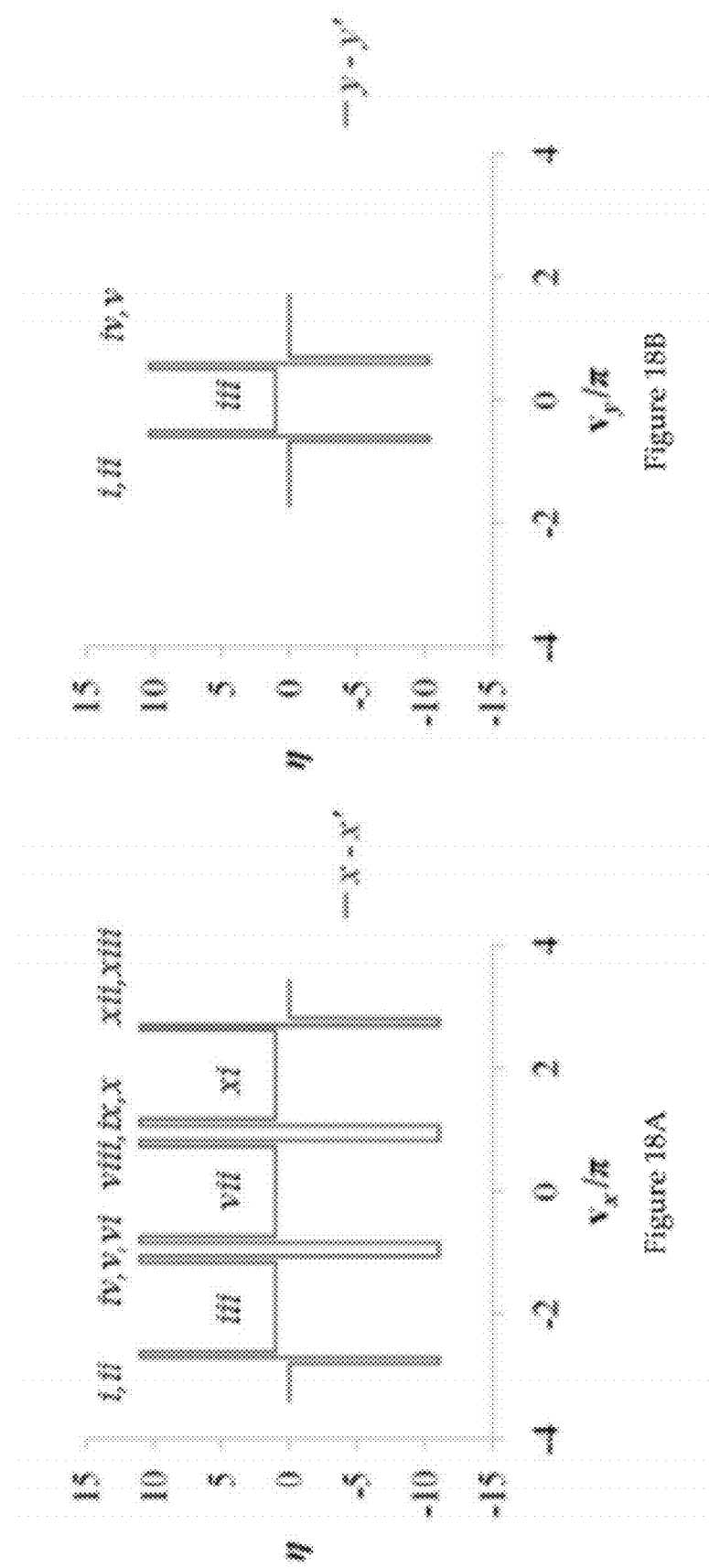

OPTICAL WAVEGUIDES HAVING FLATTENED HIGH ORDER MODES

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to waveguides that propagate light at multiple discreet speeds—equivalently, multiple discreet transverse modes—and that transport telecommunications signals, generate or amplify light, transport electromagnetic power, or are used for decorative or display purposes.

2. Description of Related Art

Optical fiber waveguides that transport telecommunications signals are typically designed and manufactured to allow light to propagate at just one speed, to ensure that a signal arrives at its destination in a single, brief instant. Waveguides that generate or amplify light, such as those doped with rare-earth ions, are also typically designed and manufactured to allow light to propagate at just one speed, in this case to ensure that the pattern of radiation emitted by the waveguides may be focused to the tightest possible spot. Such a radiation source is said to be "diffraction limited."

Waveguides that transport telecommunications signals or that generate or amplify light may also be designed and manufactured to allow light to propagate at multiple discreet speeds (in multiple discreet transverse radiation patterns, or "modes"). Such waveguides are sometimes more economical to manufacture or to interconnect, and the benefits of the single-speed fibers may be retained by preferentially attenuating light that has propagated at undesired speeds or by selectively exciting light that propagates at one preselected speed.

An advantage of the selective-excitation approach is that light that propagates in a high-order mode—a mode that forms many well-defined rings or spots in a plane transverse to the propagation direction of the light—travels at an effective index that differs more significantly, when compared to the differences that naturally arise in conventional waveguides, from the effective indices of its neighboring modes. This inherent advantage simplifies the task of selectively exciting and de-exciting a desired mode, but unfortunately a large fraction of the power guided by the high order circularly-symmetric modes of conventional waveguides tends to be located near the central axis of the waveguide, and this hot-spot may reduce the threshold for undesired nonlinear propagation artifacts and waveguide damage.

Waveguides that allow light to propagate at only one speed most often distribute their guided power in the shape that is Gaussian, or nearly Gaussian, in the plane transverse to the propagation direction of light. Waveguides may also be designed so that their guided power is flat, or nearly flat, in the transverse plane. Since the peak power density of a flattened-mode waveguide is lower than that of a Gaussian-mode waveguide, the flattened-mode waveguide has a higher (and thus more desirable) threshold for nonlinear propagation artifacts and waveguide damage.

SUMMARY OF THE INVENTION

The present invention relates to dielectric, semiconductor, or metallic waveguides that propagate light at multiple discreet speeds. The structure of the waveguide is tailored so that the transverse profile of light propagating at one of those speeds is flattened, or largely flattened.

The transverse profile of a desired propagation mode is flattened by adding layers or groups of layers at selected intervals, in order to stitch together flat or substantially flat portions of the mode to make a larger flattened mode. The layers or groups of layers induce the field or its slope to change significantly, and may additionally change the sign of the field one or multiple times. An additional layer group or groups bind the flattened mode to a surrounding cladding.

By applying this invention, the field of the stitched high-order mode can be made more robust to nonlinear propagation defects, and can be made to propagate at a speed that differs significantly from the speeds of its neighboring modes (when compared to the differences that naturally arise in conventional waveguides). These attributes make the higher order mode easier to cleanly excite than a mode of the same size in a conventional waveguide. Other benefits are that the stitched high order mode waveguide can be designed to pack the power it guides very efficiently, and can be designed to avoid problematic hot spots in the guided power. The spatial extent of the flattened sub-portions of the mode may also be independently varied to reduce nonlinear propagation artifacts or to create unique or aesthetically pleasing patterns.

The present invention has applications in many areas. Examples include uses in (i) optical fiber waveguides for high energy or high power lasers or amplifiers, (ii) laser defense applications, (iii) short pulse laser sources and amplifiers, (iv) seed sources and amplification systems for the National Ignition Facility (NIF) laser system at Lawrence Livermore National Laboratory, (v) transport fiber and fiber laser sources for telecommunication applications, (vi) fibers propagating modes having unique or attractive shapes for decorative or display purposes, (vii) optical power distribution and power distribution networks and (viii) various materials processing and machining applications including metal, dielectric or plastic cutting, brazing and soldering, and deep penetration metal welding.

BRIEF DESCRIPTION OF THE DRAWINGS

FIGS. 2A-C illustrate, for a slab-like geometry, three examples of half-wave stitching groups.

FIGS. 3A-C illustrate, for a slab-like geometry, three examples of full-wave stitching groups.

FIGS. 4A-C illustrate, for a slab-like geometry, three examples of termination layers.

FIG. 6A shows, for a cylindrically-symmetric geometry, half-wave stitching accomplished with a single layer.

FIG. 6B shows, for a cylindrically-symmetric geometry, the addition of a second layer to make the magnitude of the field to the right of the group the same as the magnitude to its left.

FIG. 6C illustrates, for a cylindrically-symmetric geometry, an evanescent half-wave stitching group, a term that here refers to groups having at least one layer in which the field is the sum of exponentially growing and decaying functions.

FIGS. 7A-C illustrate, for a cylindrically-symmetric geometry, three full-wave stitching groups, that is, three groups that cause the field's polarity to change sign an even number of times.

FIGS. 8A-C illustrate, for a cylindrically-symmetric geometry, three fractional wave stitching groups, that is, three groups that return the field's slope to zero without allowing the field's polarity change to sign.

FIGS. 13A-C show the size-spacing products for the effective indices of the modes of the three designs, as a function of the azimuthal order 1.

FIGS. 15A and 15B illustrate the refractive index profiles along lines x-x' and y-y', respectively, of FIG. 14.

FIGS. 18A and 18B illustrate the refractive index profiles along lines x-x' and y-y', respectively, of FIG. 17.

DETAILED DESCRIPTION OF THE INVENTION

The present invention reduces the intensity of light propagating in the core of a preselected high-order propagation mode of a waveguide by distributing it more evenly across the guide's cross-section via careful design of the refractive index profile. The resulting high order mode is more robust to perturbation than is the fundamental mode of an equivalent conventional or flattened waveguide, and does not suffer the potentially problematic hot spots of conventional high order mode fibers.

The waveguides described here are presumed to be made of glass or of a material that allows light to propagate a suitable distance with a suitably low loss to meet the needs of its intended application.

Figure 1:
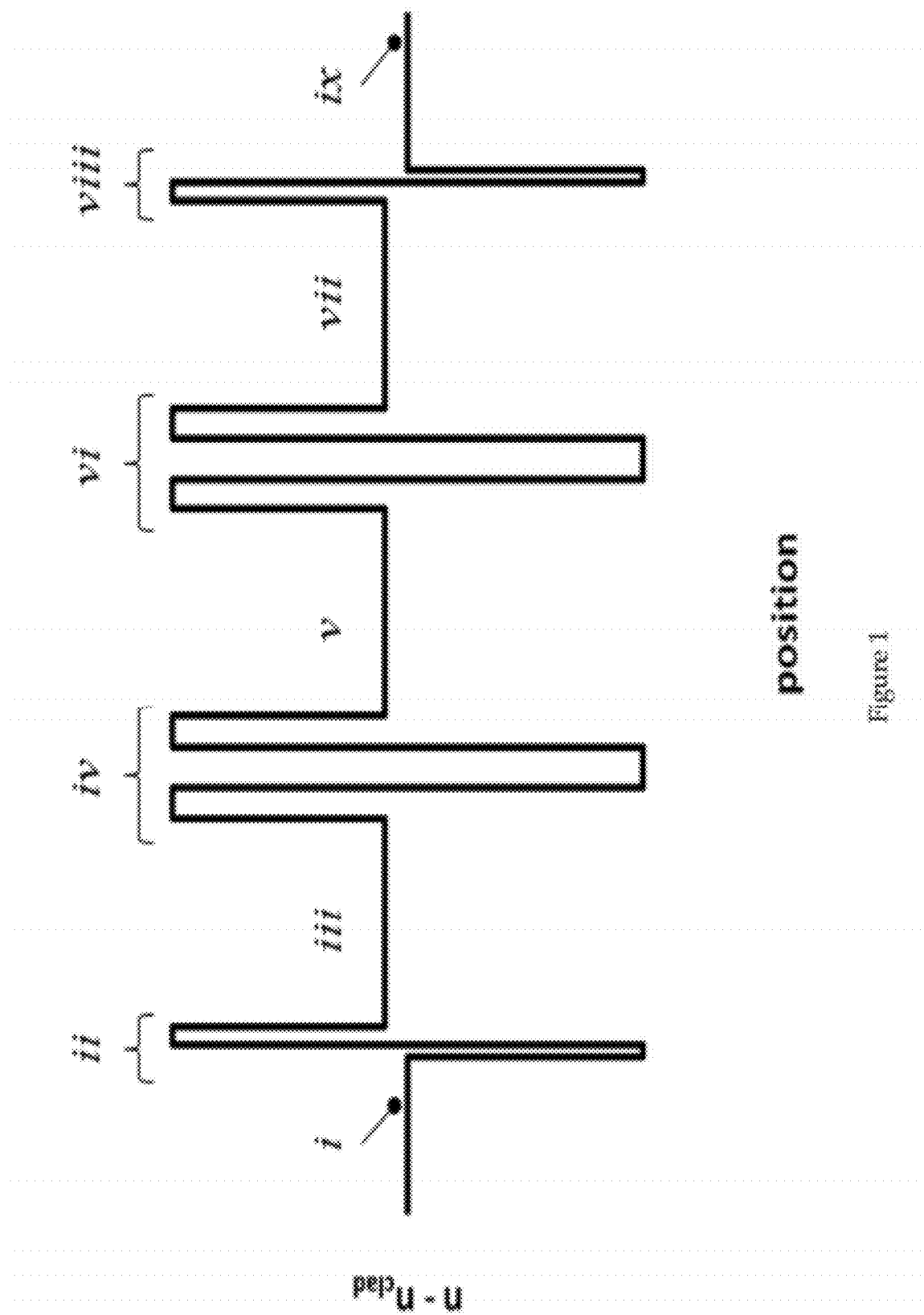
FIG. 1 illustrates the refractive index profile of a notional waveguide, showing flattening layers (iii, v, vii), stitching groups (iv, vi), and termination groups (ii, viii), surrounded by a cladding (i, ix).

FIG. 1 illustrates the refractive index profile of a notional waveguide, showing flattening layers, stitching groups, and termination groups.

In general, the waveguide structure is chosen so that, over selected portions of its cross-section, the local refractive index is equal to or nearly equal to the effective refractive index of the propagating mode; this condition allows the electric or magnetic field of the propagating mode in those regions to be constant or nearly constant with position. The structure is broken at selected intervals by "stitching layers"—layers or series of layers that together act to change the sign of the field or cause the field or its slope to change to a selected level. The layered structure at the boundary of the waveguide is additionally chosen to match the well-known boundary conditions of the fields in the cladding, or "terminating" the mode, as described below.

In general, the thickness (spatial extent) of the stitching layer or layers can be reduced by increasing the refractive index contrast (the index differentials) of the layer or layers that comprise the stitches. The index contrast can be varied by altering the concentrations of well-known index-adjusting dopants in silica glass. Larger index differences can be obtained by other well-known techniques, such as using semiconductor materials, phosphide-based glasses, or by incorporating holes into the glass structure.

Slab-Like Waveguides

Consider an essentially one-dimensional, slab-like waveguide, that is, one whose cross-section is nominally rectangular, whose long dimension is much larger than its narrow dimension. The wave equation that governs the field, $\psi$, of the modes in such a guide is given by:

$$\left\{ \frac{\partial^2}{\partial x^2} + \left(\frac{2\pi}{\lambda}\right)^2 [n^2(x) - n_{\mathit{eff}}^2] \right\} \psi(r) = 0$$

where $\psi$ represents the field of a guided mode, n(x) is the index at position x, $n_{\mathit{eff}}$ the effective index of the mode, and $\lambda$ is the vacuum wavelength of the guided light. In the discussion that follows, we assume the index profile consists of discreet, step-like layers. Define the dimensionless and scaled variables:

$$v_x = \frac{2\pi}{\lambda} x NA_{\mathit{flat}}$$

$$\eta(v_x) = [n^2(v_x) - n_{\mathit{clad}}^2] / NA_{\mathit{flat}}^2$$

and:

$$\eta_{\mathit{eff}} = (n_{\mathit{eff}}^2 - n_{\mathit{clad}}^2) / NA_{\mathit{flat}}^2$$

where:

$$NA_{\mathit{flat}} = \sqrt{n_{\mathit{flat}}^2 - n_{\mathit{clad}}^2}$$

where $n_{\mathit{clad}}$ is the refractive index of a cladding that surrounds the waveguide and $n_{\mathit{flat}}$ is the refractive index of the layer or layers in which the field will ultimately be flattened. In these terms, the scaled wave equation becomes:

$$\left\{ \frac{\partial^2}{\partial v_x^2} + \eta(v) - \eta_{\mathit{eff}} \right\} \psi(v_x) = 0$$

Field-Flattened Layers

Consider a layer whose refractive index is equal to the effective index of a guided mode, that is, a layer having $\eta = \eta_{\mathit{eff}}$. For such a layer, the previous equation has the solution:
$\psi = A + B v_x$, where A and B are constants determined by the boundary conditions on that layer. For weakly-guided modes, those conditions are that the field and its derivative with respect to x are continuous across boundaries; note that by definition of $v_x$, the field is thus also continuous with respect to $v_x$. That derivative is:

$$\frac{d\psi}{dv_x} = B$$

The previous two equations apply at any position within the layer, as well as at the layer's boundaries. The equations can be inverted to express A and B in terms of the field and its derivative at $v_{x1}$:

$$\begin{bmatrix} A \\ B \end{bmatrix} = \begin{bmatrix} 1 & v_{x1} \\ 0 & 1 \end{bmatrix} \begin{bmatrix} \psi_1 \\ \frac{d\psi}{dv_x}\Big|_1 \end{bmatrix}$$

Since A and B do not change within a layer, we may write a similar expression at $v_{x2}$:

$$\begin{bmatrix} A \\ B \end{bmatrix} = \begin{bmatrix} 1 & v_{x2} \\ 0 & 1 \end{bmatrix} \begin{bmatrix} \psi_2 \\ \frac{d\psi}{dv_x}\Big|_2 \end{bmatrix}$$

Equating these expressions for A and B yields a relationship between the field and its derivative at one position and those at another:

$$\begin{bmatrix} \psi_1 \\ \frac{d\psi}{dv_x}\Big|_1 \end{bmatrix} = \begin{bmatrix} 1 & \Delta v_x \\ 0 & 1 \end{bmatrix} \begin{bmatrix} \psi_2 \\ \frac{d\psi}{dv_x}\Big|_2 \end{bmatrix}$$

(for $\eta = \eta_{\mathit{eff}}$)

where $\Delta v_x = v_{x2} - v_{x1}$.

Note that if the field's slope is zero on either side of an $\eta = \eta_{\mathit{eff}}$ layer (equivalently, an $n = n_{\mathit{eff}}$ layer), it stays zero within the layer. Thus, a field-flattened layer is any layer whose index is equal to the effective index of the guide's preferred mode, and surrounded by appropriate layer groups, the stitching or termination groups as described below.

Stitching Groups

A stitching group is a layer or group of layers in which the field's slope is zero at its leftmost and rightmost interfaces, and wherein the field varies substantially between those interfaces. In most examples herein, the field changes polarity (sign) one or more times within the stitching group.

Consider layers in which the local index is greater than the preferred mode's effective index, that is, layers where $\eta > \eta_{\mathit{eff}}$. For those layers, the solution to the one-dimensional wave equation is a linear combination of sine and cosine functions. Following an analysis similar to the one outlined for the $\eta = \eta_{\mathit{eff}}$ case, the field and its derivative may be expressed by the following matrix equation:

$$\begin{bmatrix} \psi_2 \\ \frac{d\psi}{dv_x}\Big|_2 \end{bmatrix} =$$

$$\begin{bmatrix} \cos(\Delta v_x \sqrt{\eta - \eta_{\mathit{eff}}}) & \frac{1}{\sqrt{\eta - \eta_{\mathit{eff}}}} \sin(\Delta v_x \sqrt{\eta - \eta_{\mathit{eff}}}) \\ -\sqrt{\eta - \eta_{\mathit{eff}}} \sin(\Delta v_x \sqrt{\eta - \eta_{\mathit{eff}}}) & \cos(\Delta v_x \sqrt{\eta - \eta_{\mathit{eff}}}) \end{bmatrix}$$

$$\begin{bmatrix} \psi_1 \\ \frac{d\psi}{dv_x}\Big|_1 \end{bmatrix}$$

(for $\eta > \eta_{\mathit{eff}}$)

Note that if a layer's index and thickness obey:

$\Delta v_x \sqrt{\eta - \eta_{\mathit{eff}}} = (2m+1)\pi$ where m represents zero or a positive integer, then after an interval $\Delta v_x$ the field and its derivative both change signs but retain their magnitudes. Further, if the field's slope is zero on one side of a layer, that is, if the field is flat there, then it is also flat on the other side. Thus, the above is the condition for a single-layer stitching group wherein the field changes sign from one side of the group to the other. FIG. 2A illustrates such a layer.

Note also that if a layer's index and thickness obey:

$\Delta v_x \sqrt{\eta - \eta_{\mathit{eff}}} = 2m\pi$ where m represents zero or a positive integer, then after an interval $\Delta v_x$ the field and its derivative retain their signs and magnitudes. Further, if the field's slope is zero on one side of a layer, that is, if the field is flat there, then it is also flat on the other side. Thus, the above is the condition for a single-layer stitching group wherein the field returns to the same sign from one side of the group to the other. FIG. 3A illustrates such a layer.

A similar analysis can be applied to layers whose index is less than a mode's effective index, to find:

$$\begin{bmatrix} \psi_2 \\ \frac{d\psi}{dv_x}\Big|_2 \end{bmatrix} =$$

$$\begin{bmatrix} \cosh(\Delta v_x \sqrt{\eta_{\mathit{eff}} - \eta}) & \frac{1}{\sqrt{\eta_{\mathit{eff}} - \eta}} \sinh(\Delta v_x \sqrt{\eta_{\mathit{eff}} - \eta}) \\ \sqrt{\eta_{\mathit{eff}} - \eta} \sinh(\Delta v_x \sqrt{\eta_{\mathit{eff}} - \eta}) & \cosh(\Delta v_x \sqrt{\eta_{\mathit{eff}} - \eta}) \end{bmatrix}$$

$$\begin{bmatrix} \psi_1 \\ \frac{d\psi}{dv_x}\Big|_1 \end{bmatrix}$$

(for $\eta < \eta_{\mathit{eff}}$)

where 'sin h' and 'cos h' designate the hyperbolic sine and cosine functions.

As an example, consider a three-layer stitching group, one in which the leftmost and rightmost layers have refractive indices greater than a mode's effective index, and the central layer has a refractive index less than the mode's effective index. Further, let the mode of interest, or preferred mode, be flattened in the layers that abut either side of the group; thus the field's slope is zero on both sides of the three-layer group, and since the mode is field-flattened, $\eta_{\mathit{eff}} = 1$ by definition.

There are six unknowns, the index and thickness of each of the three layers. For now, assume the indices are known, leaving just the three thicknesses as unknowns. Let the leftmost and rightmost layers have equal thicknesses and indices; these are not necessary conditions, but in some situations may prove desirable—for example, they may simplify fabrication, create advantageous properties for the preferred mode, or ameliorate problems associated with one or more undesired modes. Finally, let the width-averaged scaled index of the three layers be equal to the scaled index of the preferred mode, that is:

$$\langle \eta \rangle = \frac{\sum_i \eta_i \Delta v_{xi}}{\sum_i \Delta v_{xi}} = \eta_{\text{eff}} = 1$$

where $\Delta v_{xi}$ refers to the scaled width of the $i^{th}$ layer and the summation is over all layers in the group, for this example, three layers. Note that this constraint on $\langle \eta \rangle$ is not necessary, but in some situations may prove desirable.

The constraints imposed for this example leave only one free variable; without loss of generality, let this be the thickness of the leftmost layer. Assume that this group of layers is placed between field-flattening layers, making the field's slope zero on both sides; further assume that the group is intended to return the field to its original magnitude but changes the field's sign, or polarity. Mathematically:

$$\begin{bmatrix} \psi_{out} \\ 0 \end{bmatrix} = \begin{bmatrix} \cos(\alpha_3) & \frac{\Delta v_3}{\alpha_3}\sin(\alpha_3) \\ -\frac{\alpha_3}{\Delta v_3}\sin(\alpha_3) & \cos(\alpha_3) \end{bmatrix} \begin{bmatrix} \cosh(\alpha_2) & \frac{\Delta v_2}{\alpha_2}\sinh(\alpha_2) \\ \frac{\alpha_2}{\Delta v_2}\sinh(\alpha_2) & \cosh(\alpha_2) \end{bmatrix}$$

$$\begin{bmatrix} \cos(\alpha_1) & \frac{\Delta v_1}{\alpha_1}\sin(\alpha_1) \\ -\frac{\alpha_1}{\Delta v_1}\sin(\alpha_1) & \cos(\alpha_1) \end{bmatrix} \begin{bmatrix} \psi_{in} \\ 0 \end{bmatrix}$$

where $\psi_{in}$ and $\psi_{out}$ are the fields on either side of the group. The aforementioned constraints imply that $\psi_{out} = -\psi_{in}$ and $\alpha_1 = \alpha_3$. In addition, the constraint on the width-averaged index implies:

$$\alpha_2 = 2\alpha_1 \sqrt{\frac{\eta_1 - 1}{1 - \eta_2}}$$

Now assign indices. The net width of the stitching group tends to be smaller when the index contrast is made larger, so for this example set the scaled index of the leftmost and rightmost layers to $\eta = +10$ and the index of the center layer to $\eta = -10$; these are reasonable values for doped silica assuming $NA_{\text{flat}}$ is roughly 0.05.

Solving the above matrix equation results in $\alpha_1 = \alpha_3 = 0.996$ and $\alpha_2 = 1.801$; taking into account the assigned values of the scaled indices, we find $\Delta v_{x1} = \Delta v_{x3} = 0.106\pi$ and $\Delta v_{x2} = 0.173\pi$. FIG. 2A-C illustrates several half-wave stitching layers for one-dimensional waveguides. FIG. 3A-C illustrates several full-wave stitching groups for one-dimensional waveguides, determined in a manner similar to those listed above.

Termination Groups

A termination group is a layer, or group of layers, that transition the field and the field's slope at the boundary of the flattening layer or stitching group nearest the cladding to the field and slope required within the cladding. For a bound mode in a one-dimensional waveguide, the field in the cladding must follow the form:

$$\Omega = A \exp(-v_x\sqrt{n_{\text{eff}}^2 - n_{\text{clad}}^2}) = A \exp(-v_x\sqrt{\eta_{\text{eff}}})$$

where A is a constant and the final form of the above equation follows from the definition of $\eta$. At the cladding interface, and throughout the cladding, the ratio of the field's slope to the field must thus be:

$$\frac{d\psi/dv_s}{\psi} = -\sqrt{\eta_{\text{eff}}}$$

For a given design and a given mode, this ratio can also be calculated at the cladding interface through the matrices described above, or through other wave propagation methods. In general, the value of the ratio at the final interface of the final flattening layer or stitching group does not match the ratio required in the cladding; the termination group transitions the fields so the ratio becomes matched. This procedure is analogous to impedance matching in electrical circuits.

Consider a one-dimensional waveguide consisting of a single field-flattening layer, a single termination layer having an index greater than the effective index of the flattened mode to be guided, and a cladding. Represent the field at the boundary of the field-flattening layer by the symbol $\psi_0$, and note that since the field is flat, its slope there is zero ($d\psi/dv_x = 0$). The field and slope at the cladding interface is then:

$$\begin{bmatrix} \psi_{clad} \\ \frac{d\psi}{dv_x}\Big|_{clad} \end{bmatrix} = $$

$$\begin{bmatrix} \cos(\Delta v_x \sqrt{\eta - \eta_{\text{eff}}}) & \frac{1}{\sqrt{\eta - \eta_{\text{eff}}}}\sinh(\Delta v_x \sqrt{\eta - \eta_{\text{eff}}}) \\ -\sqrt{\eta - \eta_{\text{eff}}}\sin(\Delta v_x \sqrt{\eta - \eta_{\text{eff}}}) & \cos(\Delta v_x \sqrt{\eta - \eta_{\text{eff}}}) \end{bmatrix} \begin{bmatrix} \psi_0 \\ 0 \end{bmatrix}$$

For the flattened layer, $\eta_{\text{eff}} = 1$ by definition, and termination reduces to picking the index and thickness of the single termination layer of this example such that:

$$\sqrt{\eta - 1} \tan(\Delta v_x \sqrt{\eta - 1}) = 1$$

If we choose $\eta = 10$, then the argument of the tangent function is 0.322, making $\Delta v_x = 0.034\pi$. FIG. 4A illustrates this termination layer. FIG. 4B is a two-layer termination group. FIG. 4C illustrates a termination layer in which the field crosses zero.

Example Waveguides

FIG. 5A-E gives examples of one-dimensional waveguides; these waveguides are designed by interspersing field-flattening layers with stitching groups, then adding a termination group to bind the mode to the cladding. The designs in FIG. 5A-E are symmetrical about the origin and thus only half of each is shown; note, however, that symmetry is not a necessary condition. The top row shows the scaled refractive index profiles and corresponding field of the flattened modes. The second row lists the designs—scaled indices and scaled thicknesses, in tabular form—of the layers that comprise the guides. The bottom row shows the size-spacing products, $\theta_x$, defined below, of the modes of the waveguides. The widths of the field-flattening layers and the designs and number of the stitching groups vary from example to example. The termination group is the same for all waveguides, though alternate termination groups may be applied instead.

Though the analysis presumes an idealized waveguide that is purely one-dimensional, real waveguides have a two-dimensional cross-section. The idealized analysis is approximately correct, and can be refined with commercial waveguide analysis software. Though the narrow dimensions of the waveguides illustrated in FIG. 5 are not assigned, the following quantity, $\theta_x$, a size-spacing product, provides a means of comparing waveguides:

$$\theta_x = \eta_{\text{eff}} w_{\text{flat,scaled}} \sim (n_{\text{eff}}^2 - n_{\text{clad}}^2) A_{\text{flat}}$$

where the symbol '~' is read here as 'is proportional to,' and the quantity $w_{flat,scaled}$ is a measure of the effective width—the longer dimension of a substantially rectangular guide—of the guide's flattened mode, and is defined as:

$$w_{flat,scaled} = \frac{\left(\int \psi^2 dv_x\right)^2}{\int \psi^4 dv_x}$$

Waveguides having larger separations in $\theta_x$ are often preferred, as this implies, for a given size of the flattened mode, larger spacings between the effective indices of the waveguides' modes; or for given effective index spacings, a larger flattened mode. The bottom rows of FIGS. 5A-E illustrate the distribution of $\theta_x$ values for the allowed modes of those waveguides. In the bottom row, the darker lines correspond to modes that are symmetric about the origin (x=0), the gray lines correspond to modes that are anti-symmetric, and the dotted lines designate the waveguide's flattened mode.

Figures 5A, 5B, 5C, 5D, 5E:
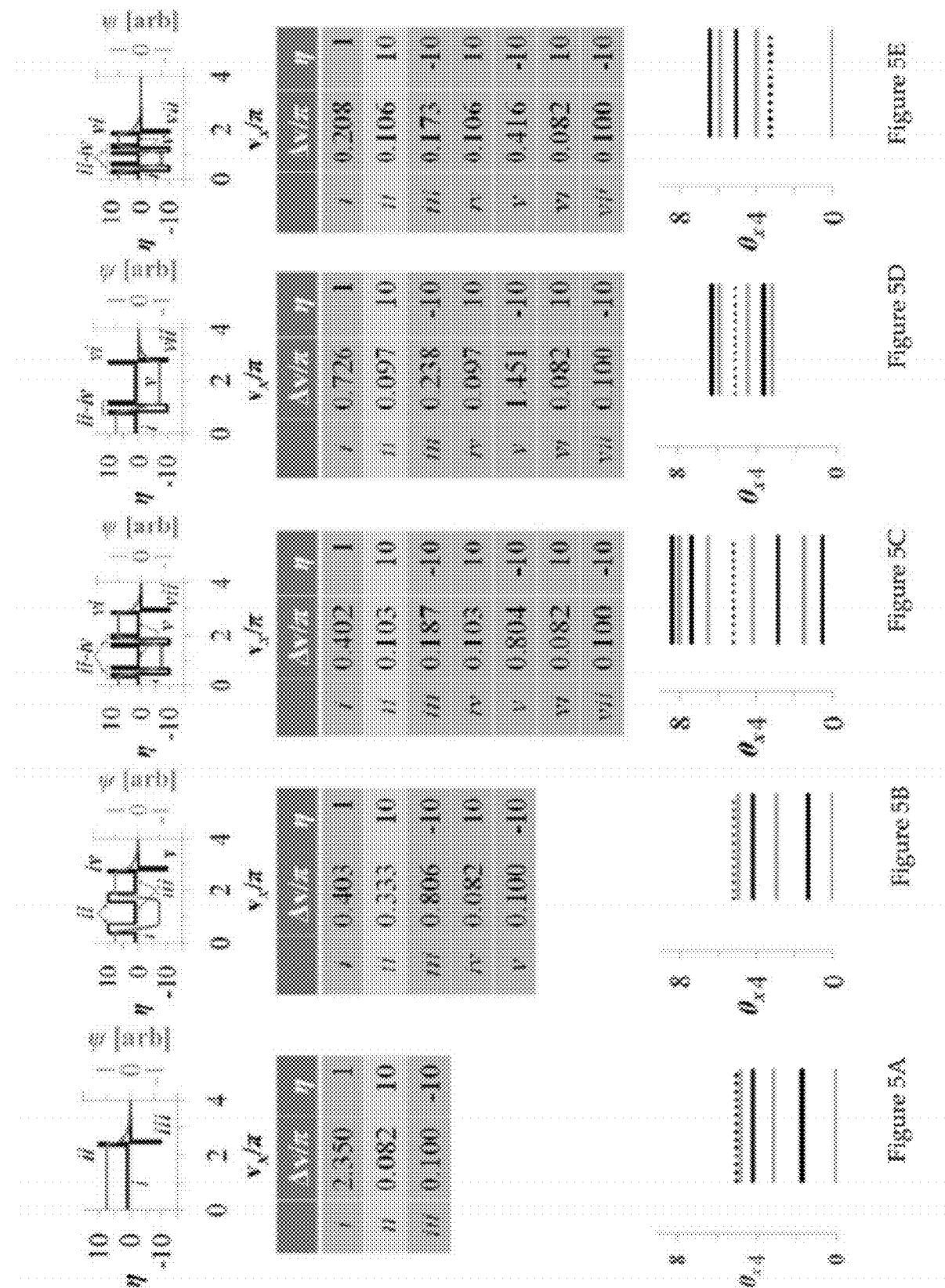
FIGS. 5A-E illustrate, for a slab-like geometry, several examples of waveguides which propagate flattened higher-order modes, and includes the designs, the field of the flattened high order mode and size-spacing products of each guides modes.

FIG. 5A corresponds to a conventional flattened mode fiber, similar to those shown in the literature. Note that the spacing between the flattened mode and its nearest neighboring mode is relatively small. The spacing for the example of FIG. 5B is only slightly larger; note, however, that the waveguide of FIG. 5B may have more pronounced advantages when considering other attributes.

Compared to the modal spacings in FIG. 5A, those in FIG. 5C are significantly larger, as are those in FIG. 5D, with the latter also having fewer allowed modes; in some applications, fewer modes is advantageous since extraneous modes, if inadvertently excited, can be problematic. FIG. 5E shows the largest separation between the flattened mode and the cladding ($\theta_x$=0), which eliminates cross-coupling modes having orders higher than (modes having $\theta_x$ less than) the preferred flattened mode.

The examples of FIG. 5 illustrate that by varying the thicknesses of a waveguide's field-flattening layers or the structure of the stitching groups, the effective index of the preferred mode, and the effective indices of other allowed modes, may be independently and preferentially altered. Though not illustrated, varying the structure of the termination group causes similar effects. These same variations also affect many other properties of the guide, such as the modes' group indices and chromatic dispersion, and their overlap with embedded gain media.

Cylindrically-Symmetric Waveguides

Most nonlinear propagation artifacts in glass waveguides can be reduced by spreading the power the waveguides carry over a large area. Many telecommunications and laser applications, however, require the power to be confined to a single transverse spatial mode. Unfortunately, as a mode's area increases, its effective index approaches those of its neighboring modes, making it susceptible to power cross-coupling and potentially degrading the mode's spatial or temporal fidelity.

Optical fibers that propagate power in a high-order mode [1, 2] offer a path to simultaneously increasing the effective area [3] of a mode and the spacing between the desired mode's propagation constant and those of its neighbors. Unfortunately, the high-order modes of a step index fiber can have hotspots—regions in their transverse profiles where the local irradiance significantly exceeds the average value—which may make them more susceptible to damage or nonlinear artifacts than modes whose power is relatively uniformly distributed, such as the fundamental.

Optical fibers having a flattened fundamental [4-8] are also attractive, as they spread the propagating power very uniformly, and in an amplifier fiber allow for uniform and efficient extraction of energy from the gain medium. Like all waveguides, though, they are bound by a mode size-spacing tradeoff, and we show below that in this regard they are only moderately better than more economically-manufactured conventional guides.

We present here a design methodology that combines the benefits of the two waveguides described above, enabling the construction of a flattened high-order mode. Specifically, we provide design rules for creating structures that support flattened mode segments, that interconnect these segments, and bind (terminate) the resulting mode to the cladding.

In the step-like structures of the following designs, the field's continuity is enforced between steps by matching the field and its radial derivative across the interfaces. The modes of the guides are analyzed by the transfer matrices of Appendix II and by a separate two-dimensional mode solver that finds the eigenmodes of the scalar Helmholtz equation.

The mathematics and physics that describe fields in general cylindrically-symmetric, stratified media have been considered by others [9-11] and are considered in the Appendices. Appendix I presents Bessel solutions to the equation governing axially-symmetric waveguides such as a conventional telecom fiber; its results can be used to determine the refractive indices and thickness of the layers that comprise the flattened, stitching, and termination groups defined below. Appendix II presents transfer matrices that can also be used to determine layer indices and thicknesses, and to determine the properties of all bound modes of the fiber. Appendix III presents closed-form solutions to the mode normalization integral. Appendix IV defines several mode size-spacing products and shows that for a given waveguide these products are fixed, a consequence of the radiance theorem. The designs of the stitching and terminating groups may be accomplished by the mathematics in the Appendices, or through trial and error with commercial mode-solving software, or a combination of the two.

Scaled Quantities

A characteristic numerical aperture of the fiber, $NA_{flat}$, is defined as:

$$NA_{flat} = \sqrt{n_{flat}^2 - n_{clad}^2} \qquad (1)$$

where $n_{clad}$ is the refractive index of the cladding and $n_{flat}$ is the index of the layer or layers over which the field is to be flattened. The scaled radial coordinate, v, is defined as:

$$v = \frac{2\pi}{\lambda} r NA_{flat} \qquad (2)$$

where $\lambda$ is the wavelength of the guided light and r is the radial coordinate. The scaled refractive index profile, $\eta(v)$, is defined as:

$$\eta(v) = [n^2(v) - n_{clad}^2]/NA_{flat}^2 \qquad (3)$$

For the flattened waveguides described here, $n_{flat}$ is usually chosen to be the minimum refractive index that can be well controlled. For silica fibers, the flattened layer might be lightly doped with an index-raising dopant such as germanium or doped with a rare-earth along with index-raising and lowering dopants. Alternatively, $n_{flat}$ might be pure silica and the cladding might be lightly doped with an index depressing agent such as fluorine; in this case, the dopant only needs to extend to the penetration depth of the desired mode.

A layer group's area-averaged index, $\langle \eta \rangle$, is defined as:

$$\langle \eta \rangle = \sum_{group} \eta_i A_i \Big/ \sum_{group} A_i \qquad (4)$$

where $\eta_i$ and $A_i$ represent the scaled index and cross-sectional area of the $i^{th}$ layer of the group. In the layer groups defined below, we sometimes constrain this value; $\langle \eta \rangle$ sometimes tunes the number of allowed modes or the guide's intermodal spacings.

Several of the examples that follow list a mode's scaled effective area and illustrate its scaled field. The scaled area is defined such that the physical area, $A_{eff}$, is given by Eq. (57):

$$A_{eff} = \frac{(\lambda/2\pi)^2}{NA_{flat}^2} A_{eff}^{scaled} \qquad (5)$$

The scaled field is defined such that the physical field, $\psi$, is given from Eq. (50):

$$\psi = \frac{2\pi}{\lambda} NA_{flat} P_0^{\frac{1}{2}} \psi_{scaled} \qquad (6)$$

where $P_0$ is the power carried by the mode.

In the following examples, $\eta$ is assumed to range between ±10, which is achievable for germanium and fluorine-doped silica provided $NA_{flat}$ is on the order of 0.06. In silica, other dopants might extend this range moderately, or in phosphate glasses or holey structures, various dopants or air holes can extend this range significantly. Moreover, in holey fibers $NA_{flat}$ might be controlled to a much smaller value, which would proportionally extend the range of $\eta$. A larger range of indices is generally advantageous, as it reduces the portion of the guide devoted to the stitching and terminating groups described below.

Flattened Layers

A flattened layer is one in which the field does not vary with radius; that is, one where:

$$\psi' = \partial \psi / \partial r \qquad (7)$$

is zero. Eq. (29) and Eq. (32) of Appendix I show that for this to occur the layer's index must be equal to the guided mode's effective index ($n_{flat} = n_{eff}$) and the azimuthal order, 1, must be equal to zero. Furthermore, it is necessary that a flattened layer be joined to appropriate stitching or termination groups, as defined below.

Stitching Groups

A stitching group is a layer or group of layers in which the field's slope is zero at both endpoints (to match that of the adjacent flattened region) and is predominantly nonzero between those points, usually crossing zero one or more times. This can be accomplished in different ways to produce a variety of mode shapes; several examples are presented here.

FIGS. 6A-C, FIGS. 7A-C, and FIGS. 8A-C illustrate stitching groups that might form a portion of a guide that supports a flattened mode. In the figures, $\eta_{flat}$ is 1 (from Eq. (3) since $n(v) = n_{flat}$), the minimum and maximum values of $\eta$ are assumed to fall between ±10, and the left edge of each group starts at $v_0 = 0.5\pi$, an arbitrarily chosen value. The thicknesses of the layers that comprise the groups were determined numerically from Bessel solutions to the wave equation, as outlined in Appendix I.

Half Wave Stitching

FIG. 6A-C illustrate three half-wave stitching groups, that is, three groups that cause the field's polarity to change sign an odd number of times.

FIG. 6A shows half-wave stitching accomplished with a single layer. The field changes by a factor of −0.78 as determined by its Bessel solution's behavior. Simulations show that for a single layer, as the left side of the group is placed at higher values of $v_0$, the ratio of the magnitude of the fields approaches unity and:

$$\lim_{v_0 \to \infty} \left( \Delta v \sqrt{\eta - 1} \right) = m\pi \qquad (8)$$

where $\Delta v$ is the scaled thickness of the layer, $\eta$ is the layer's scaled index, the numeral one arises from the assumption that the layer is surrounded by field-flattened layers having $\eta = 1$, and m is an odd integer. This can be shown to be the condition for single layer, half-wave stitching in a one-dimensional slab waveguide (in slab guides, independent of $v_0$), a reassuring result.

In FIG. 6B, a second layer is added to make the magnitude of the field to the right of the group the same as the magnitude to its left. We mention without illustration that if the sequence of the layers in FIG. 1(b) is reversed—that is, if the higher index layer is place to the right of the lower index layer—the field on that group's right can be made an even smaller fraction of the field on its left, when compared to the single layer example of FIG. 1(a).

FIG. 6C illustrates an evanescent half-wave stitching group, a term that here refers to groups having at least one layer in which the field is the sum of exponentially growing and decaying functions. The thicknesses of the layers that comprise the group are adjusted to also make the $\langle \eta \rangle = 1$ for the group (see Eq. (4)) and to make $\psi = -1$ and $\psi' = 0$ on the group's right edge.

Full Wave Stitching

FIGS. 7A-C illustrate three full-wave stitching groups, that is, three groups that cause the field's polarity to change sign an even number of times.

FIG. 7A shows half-wave stitching accomplished with a single layer. The field changes by a factor of 0.66 due to its Bessel solution's behavior. As $v_0$ is increased, an equation similar to Eq. (8) holds, but whose right-hand side is proportional to an even multiple of $\pi$.

FIG. 7B illustrates a two-layer full-wave group that returns the field's magnitude and polarity to their original values. The thickness of the group's first layer is chosen to make the field zero at the right boundary of the first layer. The thickness and index of the second layer are determined numerically to make $\psi = 1$ and $\psi' = 0$ on the group's right edge.

FIG. 7C illustrates a five-layer evanescent full-wave stitching group. The thickness of the first two layers and a portion of the thickness of the third layer are chosen so that the slope is returned to zero, the field is changed by a factor of −0.707 ($\psi^2$ drops by a factor of two) within the third layer; we also require that, for the group, $\langle \eta \rangle = 1$ (see Eq. (4)). The thicknesses of the second portion of the third layer and of the remaining two layers are determined in the same fashion, but now with the constraint that $\psi = 1$ and $\psi' = 0$ on the group's right edge.

Fractional Wave Stitching

FIGS. 8A-C illustrates three fractional wave stitching groups, that is, three groups that return the field's slope to zero without allowing the field's polarity change to sign.

FIG. 8A illustrates a central stitching layer. The central index is lower than the cladding's and the field consequently grows exponentially with position; the field on-axis is not zero, here it is 2% of the field at the layer's edge, and hence it is not classified as a half-wave group. Simulations show that layers such as this can efficiently disrupt the properties of a guide's non-flattened mode or can mitigate losses in a lossy glass such as stress-applying region, though their disadvantage is that they carry very little power. Note that the central index of FIG. 3($a$) could be made higher than the cladding's index, resulting in a field similar to that in FIG. 1($a$) or FIG. 2($a$).

FIG. 8B illustrates a three layer stitching group in which the field dips but does not pass through zero. Simulations suggest that such a group may be difficult to manufacture since its behavior varies relatively strongly with its layers' thicknesses.

FIG. 8C illustrates a three layer stitching group in which the field's magnitude rises within the group. The resulting hotspot may be advantageous for applications where field effects are to be enhanced, but problematic for many high power laser applications. Like the example of FIG. 8B, simulations suggest that such a group may be difficult to manufacture.

Termination Groups

A termination group is a layer or group of layers placed between one region of a guide, here most often a region in which the slope of the desired mode's field is zero, and the guide's cladding. The indices and thicknesses of the layers that comprise the group are chosen to force the cladding's exponentially-growing term to zero, and to thus bind the mode to the guide. Termination is analogous to impedance matching The examples of this and the following section give the flattened mode's scaled effective area and illustrate its scaled field, quantities defined by Eq. (5) and Eq. (6). For example and comparison, consider a step-index fiber that supports the $LP_{01}$ mode and is at the cusp of supporting the $LP_{02}$ mode, that is, $v=1.23\pi$. It can be shown that its fundamental mode has a scaled effective area of 37.5; therefore, if the guide's design operates at $\lambda=1$ μm and its core has a numerical aperture of 0.06, its effective area will be 260 μm$^2$. It can be further shown that this mode has a scaled peak field of 0.219=1/$\sqrt{20.8}$. If the fiber carries 1 kW of power its peak field will be 2.61 W$^{1/2}$/μm and its peak irradiance will be (2.61 W$^{1/2}$/μm)$^2$=6.8 W/μm$^2$. Note that the peak irradiance is 1.8 times higher than the simple ratio of the power to the effective area (37.5÷20.8). For flattened modes this ratio is closer to unity, for examples here it is typically 1.15.

Figures 9A, 9B, 9C:
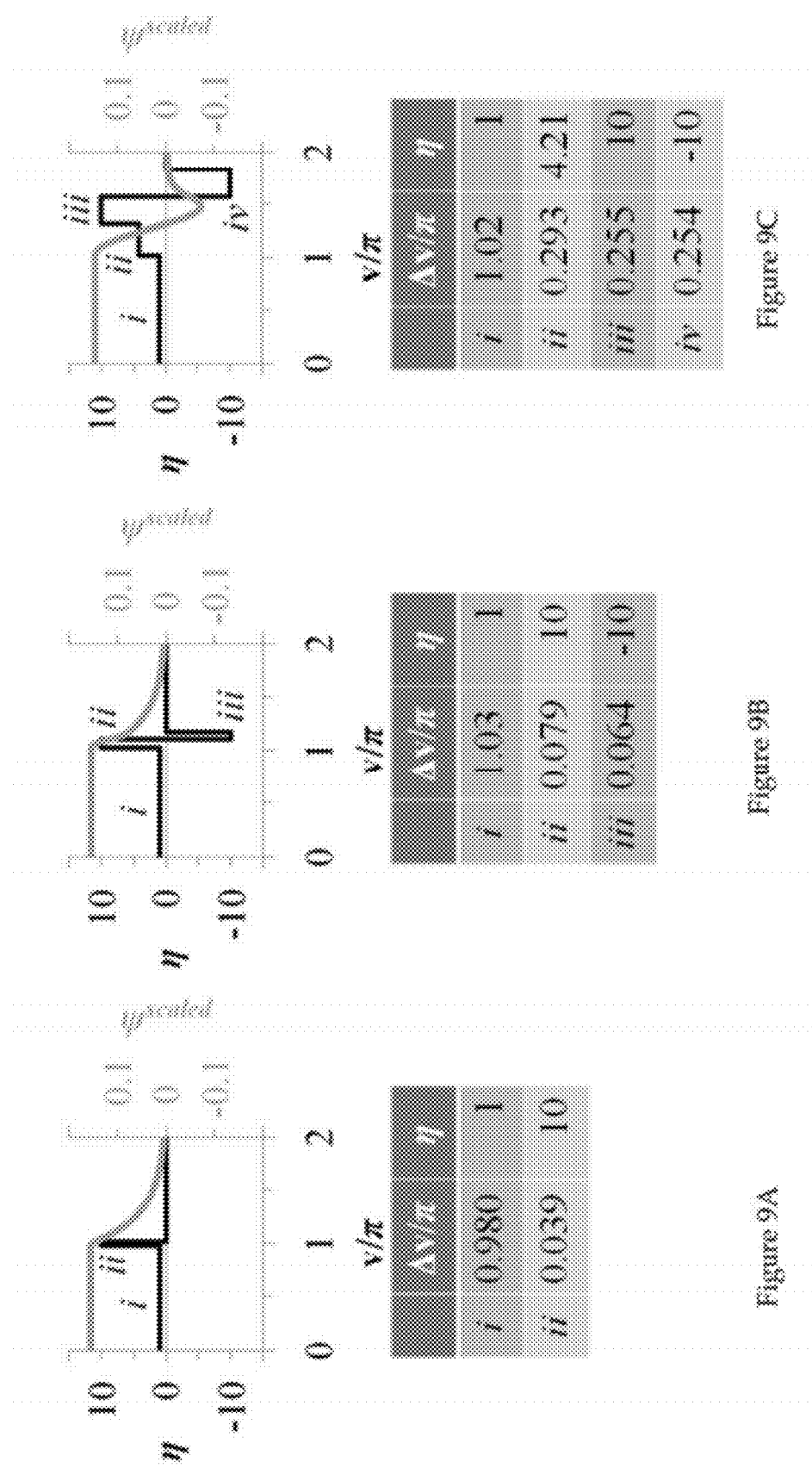
FIGS. 9A-C illustrate, for a cylindrically-symmetric geometry, three termination groups applied to three flattened waveguides.

FIGS. 9A-C illustrate three termination groups applied to three flattened waveguides. In the figure, $\eta_{flat}$ is 1 (from Eq. (3) since n(v)=n$_{flat}$) and the minimum and maximum values of η are limited to ±10. The thickness of the flattened layer is chosen so that each guide is on the cusp of allowing one axially-symmetric mode beyond the flattened mode. The thicknesses of the layers that comprise the groups were determined numerically from Bessel solutions to the wave equation, applying the constraints listed for each example.

FIG. 9A illustrates a single-layer termination group. Note that the field extends relatively far into the cladding; at the cladding interface the field is 93% of its value in the flattened region and 21% of the mode's power is guided in the cladding.

Since the effective index of the guide's flattened mode is predetermined (because n$_{eff}$=n$_{flat}$), the mode's decay constant in the cladding is fixed and consequently the field in the cladding can only be reduced by reducing the field at the cladding interface—the purpose of the additional layers in FIG. 9B and FIG. 9C.

FIG. 9B illustrates a two-layer termination group, similar to those described in [8]. In this group, the group-averaged scaled index, Eq. (3), serves as an additional constraint; simulations show that it strongly affects the field at the cladding interface. In the example, the layers' thicknesses are varied to make the field at the cladding boundary 50% of the field in the flattened layer (this occurs with the group's average index, Eq. (4), set to <η>=0.7), and to match the field's slope at the cladding interface. Roughly 7% of the mode's power is guided in the cladding.

FIG. 9C illustrates a three-layer termination group. The field is set to zero at the interface between the first and second layer, the local minima in the second layer is 50% of the field in the flattened layer, and the group-averaged index, Eq. (4), is set to <η>=0.7. The field at the cladding interface is −3% of the field in the flattened region, and 0.04% of the mode's power is guided in the cladding, though now a significant power-fraction is guided by the termination group.

TABLE 1

Parameters for two three-ringed flattened mode designs (A and B) and a step-index design (C). All quantities are dimensionless.

| layer | Design A | | Design B | | Design C | |
|---|---|---|---|---|---|---|
| | Δv/π | η | Δv/π | η | Δv/π | η |
| i | 0.900 | 1 | 0.470 | 1 | 3.240 | 1 |
| ii | 0.128 | 10 | 0.133 | 10 | | |
| iii | 0.124 | −10 | 0.137 | −10 | | |
| iv | 0.107 | 10 | 0.099 | 10 | | |
| v | 0.289 | 1 | 0.470 | 1 | | |
| vi | 0.123 | 10 | 0.120 | 10 | | |
| vii | 0.125 | −10 | 0.138 | −10 | | |
| viii | 0.110 | 10 | 0.106 | 10 | | |
| ix | 0.202 | 1 | 0.470 | 1 | | |
| x | 0.076 | 10 | 0.076 | 10 | | |
| xi | 0.064 | −10 | 0.064 | −10 | | |

Termination groups of the type shown in FIG. 9C enhance the mode's confinement but also allow at least one additional axially-symmetric mode, plus the asymmetric modes that may accompany it. Relative to the desired mode, the additional modes can have very different propagation constants, very different transverse power distributions, or both; thus they may not readily couple to the desired mode and may not be problematic.

Example Waveguides

Waveguides that propagate a flattened high order mode are created by interleaving flattening layers with stitching groups, typically starting from the inside of the guide and working outward, then binding the mode to the cladding with a termination group.

Table 1 lists designs for three waveguides; A and B both support a three-ringed, flattened mode, and C supports several higher-order modes. A and B each have three flattened layers (i, v and ix), two three-layer half-wave stitching groups similar to those illustrated in FIG. 6C (ii-iv and vi-viii), and a two-layer termination group similar to the one in FIG. 9B (x-xi). Surrounding these layers is the cladding having η=0.

In Design A the flattened layers have equal cross-sectional areas, both stitching groups have $\langle \eta \rangle = 3.0$, and the termination group has $\langle \eta \rangle = 0.7$. In Design B the flattened layers have equal widths, both stitching groups have $\langle \eta \rangle = 2.4$, and the termination group has $\langle \eta \rangle = 0.7$.

We compare the flattened $LP_{03}$ modes of Designs A and B to the $LP_{03}$ mode of a few-mode step index design, Design C. Design C is similar to the high-order mode fibers reported by others [2], but has a smaller v-number to make its mode count similar to those of A and B.

Figure 10C:
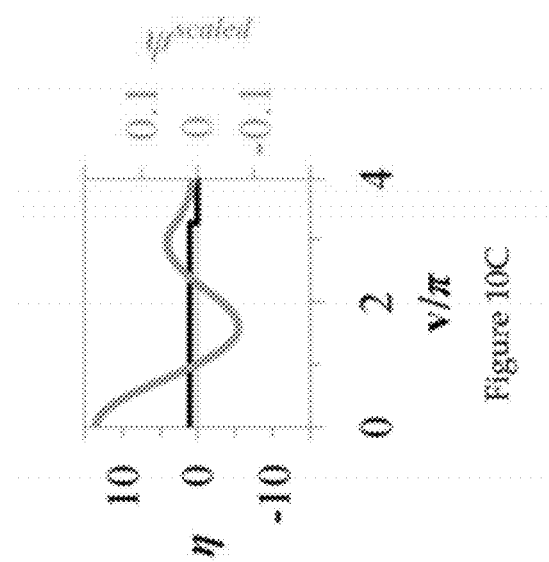
FIGS. 10A-C show line-outs of the scaled index and field for three cylindrically-symmetric designs.
Figure 10B:
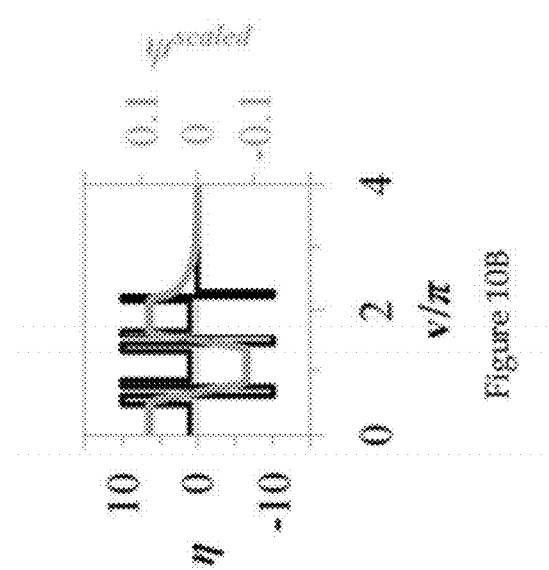
Figure 10A:
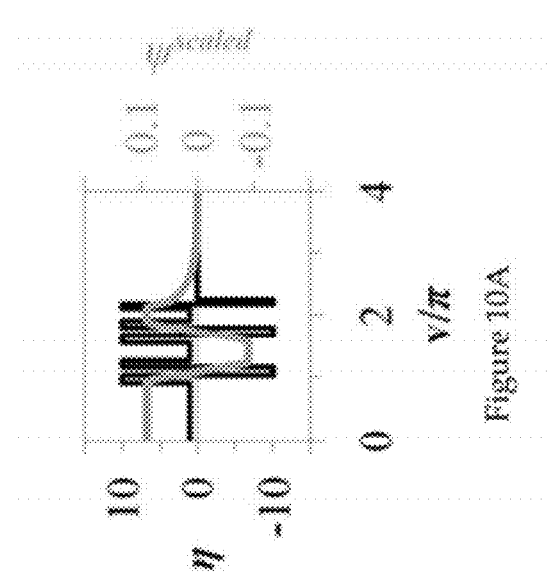

FIGS. 10A-C shows line-outs of the scaled index (dark lines) and field (grey lines) for the three designs; a), b), and c) correspond to Designs A, B, and C. All quantities are dimensionless. For Design A, the scaled area is 140 and the scaled peak field is $1/\sqrt{122}$; for Design B the values are 150 and $1/\sqrt{134}$; and for Design C the values are 140 and $1/\sqrt{30.8}$. The large disparity between the two measures of mode size for C—140 for its effective area vs. 30.8 for the reciprocal of its peak irradiance, a ratio of 4.5—is due to its central hotspot.

Figures 11A, 11B, 11C:
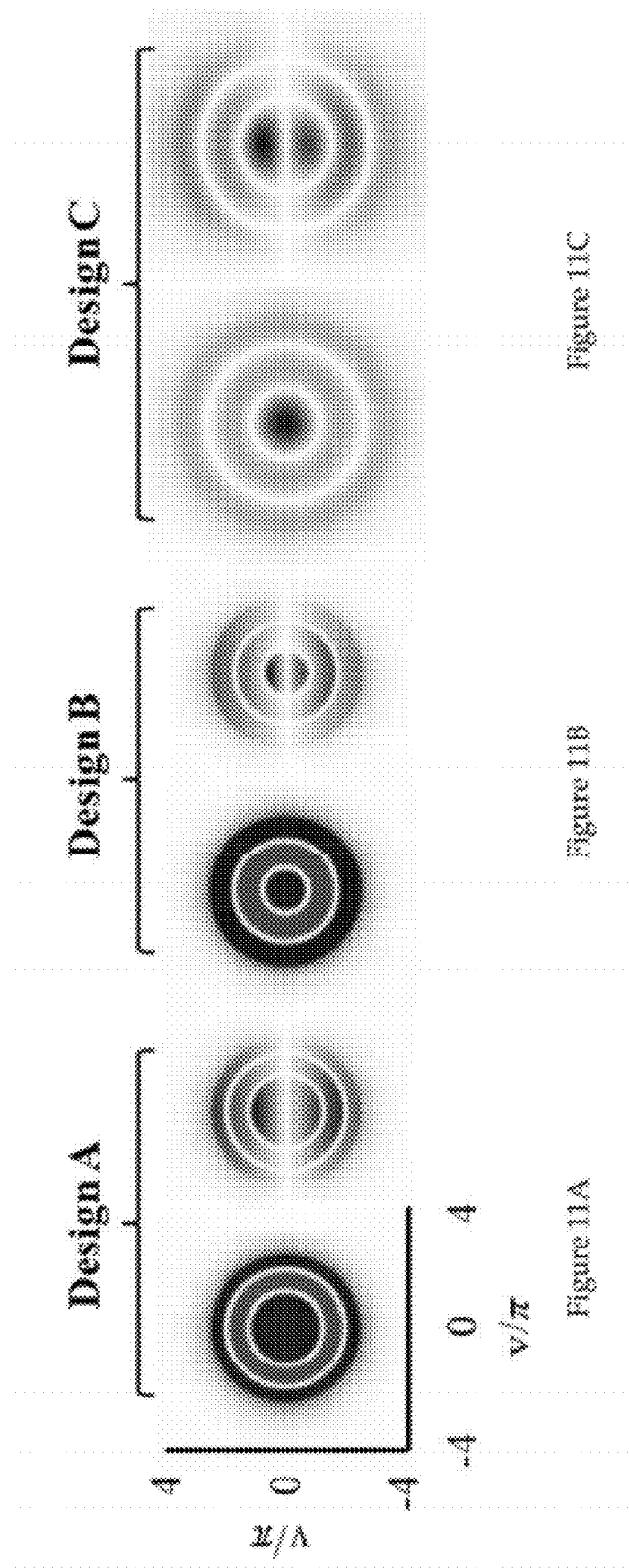
FIGS. 11A-C show field (not irradiance) distributions for the LP03 and LP13 modes of the three example designs—two flattened-mode fibers and a step index fiber.

FIGS. 11A-C show field (not irradiance) distributions for the LP03 and LP13 modes of the three example designs—two flattened-mode fibers and a step index fiber. The colors blue and red designate positive and negative polarities of the field and the depth of the color designates its relative amplitude. All figures are scaled as the one on the left, and all quantities are dimensionless. These figures show the transverse field distributions of the $LP_{03}$ and $LP_{13}$ modes of the three designs; when bent, the $LP_{03}$'s will morph toward their respective $LP_{13}$'s. Note that the power is more compactly packed in the flattened modes than in the step-index mode. Note, too, that the inner rings of $LP_{13}$ modes of the flattened designs have essentially the same diameter as the inner rings of their corresponding $LP_{03}$ modes. The inner ring of the $LP_{13}$ mode for the step-index design, though, has a substantially larger diameter than its corresponding $LP_{03}$ mode. This suggests the latter's mode will experience a larger shift in its centroid when that fiber is bent. The design of the high-order mode fiber in [2] has a central spike in its index profile, perhaps to keep its mode centered.

Figure 12A:
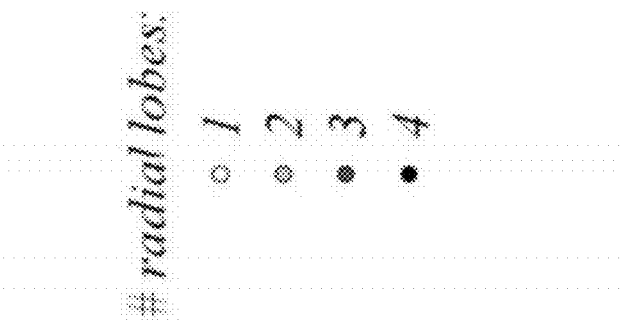
FIGS. 12A-C compare the size-spacing products (essentially the radiance), $\Theta_{\mathit{eff}}$, defined by Eq. (59) in Appendix IV, for the modes of the three designs.
Figure 12B:
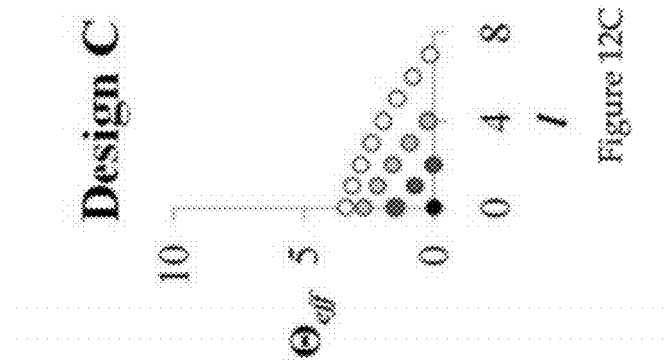
Figure 12C:
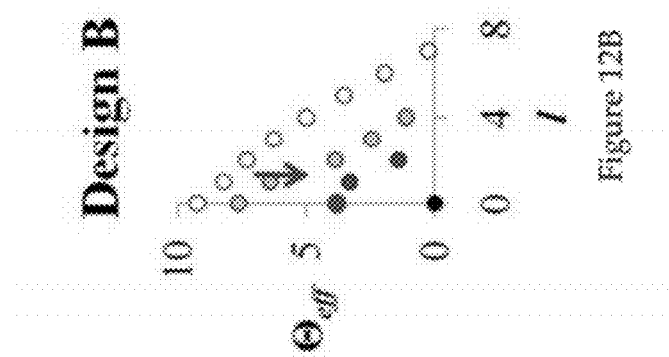

FIGS. 12A-C compare the size-spacing products (essentially the radiance), $\Theta_{\text{eff}}$, defined by Eq. (59) in Appendix IV, for the modes of the three designs. The size-spacing products are an invariant of a design. Larger values are often preferable, since they imply that larger-sized modes may be fabricated while the keeping the intermodal spacing constant, and thus keeping the likelihood of intermodal coupling constant. Keep in mind that the effective area term in $\Theta_{\text{eff}}$ equation is the same for all of a design's modes; for each design, it is chosen to be the area of the design's $LP_{03}$ mode.

The plots of FIGS. 12A-C show, as a function of the azimuthal order 1, the size-spacing products for the effective indices of the modes of the three designs ($\Theta_{\text{eff}}$ is defined in Eq. (59)). The red circles designate the $LP_{03}$ mode, which for A and B is the flattened mode. For all of a design's modes, the value of $A_{\text{eff}}$ used to calculate its size-spacing products is the area of that design's $LP_{03}$ mode. The legend adjacent to (c) applies to all figures, and all quantities are dimensionless.

For Designs A and B, the spacing between the $\Theta_{\text{eff}}$'s for the three highest-order symmetric modes, the $LP_{02}$, $LP_{03}$ (flattened mode) and $LP_{04}$ (on the cusp of existence), have been made equal by choosing an appropriate thickness for the flattened layers and by choosing an appropriate value of $\langle \eta \rangle$ (Eq. (3)) for each design's stitching groups.

For A and B, the size-spacing differential for the axially-symmetric modes is 2.5 times larger than it is for Design C, and three times larger than for the designs in FIG. 4. This implies that for the same manufacturing tolerances, the three-ringed flattened design can have 2.5 times the area of C, or three times the area of the designs in FIGS. 9A-C.

Note that the effective index spectra of A and B are strongly affected by the relative widths of the flattened layers; a relatively large spacing has been created between the $LP_{12}$ and $LP_{22}$ modes of B (red arrow in FIG. 7(b)).

The plots of FIGS. 13A-C show, as a function of the azimuthal order 1, the size-spacing products for the group indices of the modes of the three designs ($\Theta_g$ is defined in Eq. (62)). The red circles designate the flattened mode, which for A and B is the flattened mode. For all of a design's modes, the value of $A_{\text{eff}}$ used to calculate its size-spacing products is the area of that design's $LP_{03}$ mode. The legend adjacent to FIG. 13C applies to all figures, and all quantities are dimensionless.

FIGS. 13A-C compare the size-spacing products, $\theta_g$, defined by Eq. (62) in Appendix IV, for the modes of the three designs. The size-spacing products are an invariant of a design. Larger values are likely preferable, since they imply that larger-sized modes may be fabricated while the keeping the intermodal spacing constant, and thus keeping the likelihood of intermodal coupling constant. Keep in mind that the effective area term in $\Theta_g$ equation is the same for all of a design's modes; for each design, it is chosen to be the area of the design's $LP_{03}$ mode.

Note that the group index spacings of the two flattened designs, A and B, are significantly larger than those of the step-index design, C; the larger spacings may help reduce linear and nonlinear modal coupling in pulsed laser applications. Simulations show that the group delay spectra of A and B are strongly affected by the relative widths of the flattened layers. Note that a local maxima has been created for the $LP_{12}$ mode of B (red arrow in FIG. 13B), and that in FIGS. 13A and 13C, the flattened mode is the slowest axially-symmetric mode, while in B it is the fastest of all modes.

Compared to the design of conventional fibers, the design approach presented here is atypical—it begins with the desired mode's shape and then constructs a waveguide that allows it. Flattening layers are interleaved with stitching groups and a termination group binds the flattened mode to the guide; the latter is analogous to impedance matching. For axially-symmetric waveguides, the thicknesses or indices of the layers that comprise the stitching groups must be changed when the group's radial placement is changed; the examples presented here should be considered starting points for user-specific designs.

The high-order flattened modes allow two size-spacing invariants—one relating to the phase index spacing, one relating to the group index spacing—to be tailored. In particular, we have shown that the effective index (phase index) spacing of the guide's axially-symmetric modes can be increased substantially, and show that this spacing grows in proportion to the number of rings added to the structure.

Note that the flattened modes do not suffer potentially problematic hotspots, they inherently pack the propagated power into a compact cross-section, and they may reduce a mode's susceptibility to some artifacts such as nonlinear self-focusing. In an amplifier, they allow power to be extracted uniformly and efficiently across the mode's cross section. Furthermore, in amplifier applications the stitching and termination groups would not likely be doped with rare-earth ions, allowing for better control of their indices, and since the field of the flattened mode is near-zero in those regions, avoiding leaving regions of unsaturated gain that might contribute to noise or amplification of undesired modes.

Here we have qualitatively considered the bending properties of the flattened high-order modes by inspecting the transverse structure of the neighboring mode that they would couple to, and find that the flattened modes will stay well-centered.

Comparisons to the high-order modes of a step-index fiber are complicated by the fact that the effective area, as conventionally defined, does not account for hotspots in a mode's peak irradiance. We have used the effective area metric here, but suggest that in some applications it may give an overly optimistic representation of the performance of high order step-index modes. Despite applying this possibly lenient metric, the high-order mode of the step-index example fiber is less attractive than the flattened modes in terms of intermodal spacing, peak irradiance, and the compactness of its mode. While increasing the v-number of the step-index design would improve the intermodal spacing, it would also increase its mode count, accentuate its central hotspot, and further reduce its mode's packing density.

In principle, flattened high-order modes could be manufactured with conventional telecom techniques such as modified chemical vapor deposition and outside vapor deposition, but the tighter manufacturing tolerances allowed by holey-fiber construction techniques may prove, however, to be preferable.

Rectangular Waveguides

Solutions for the one-dimensional, slab-like flattened-mode waveguides, described above, provide designs or starting points for designs of rectangular waveguides that support a flattened high-order mode.

Figure 14:
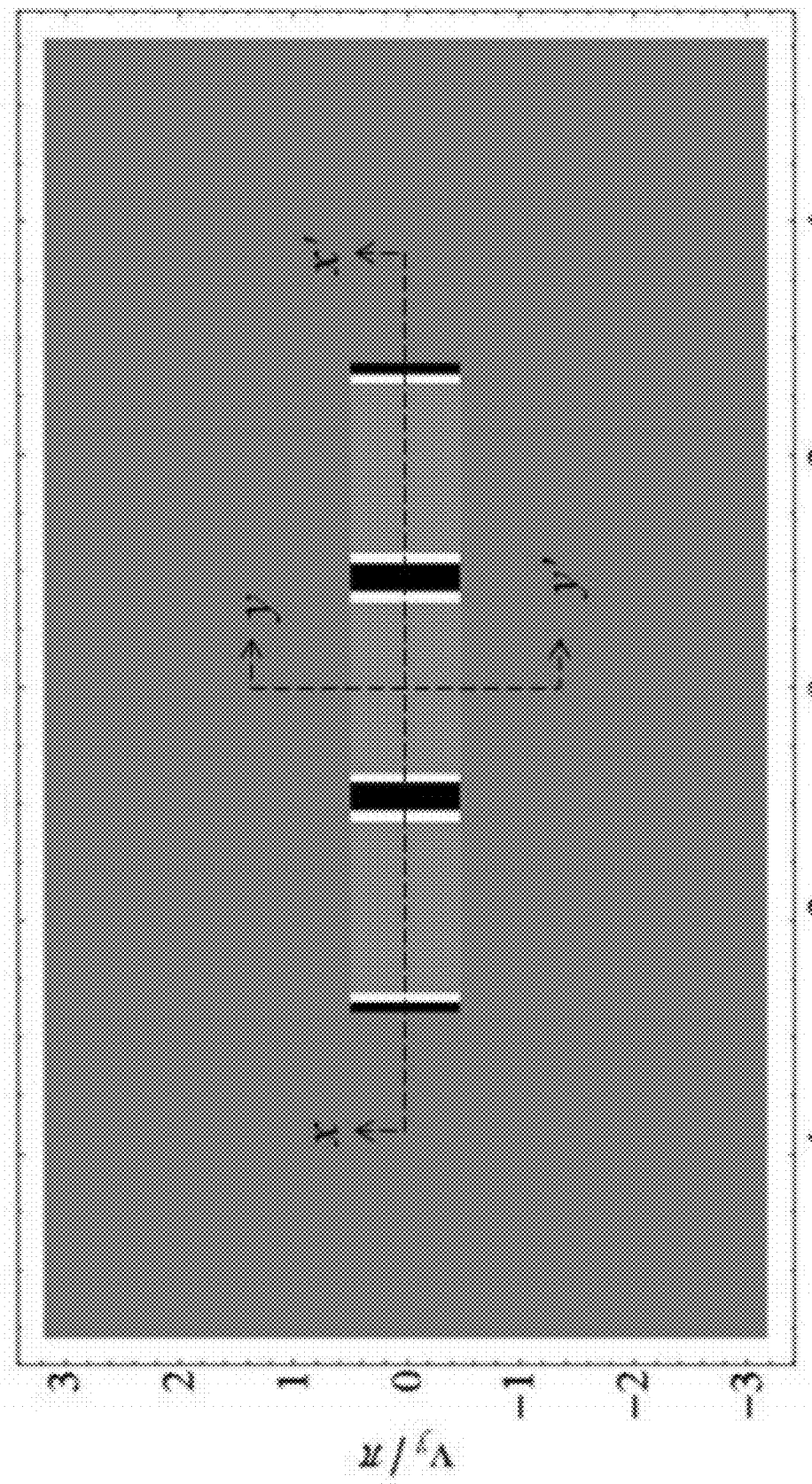
FIG. 14 illustrates the cross-section of a waveguide that supports a mode that is flattened in one direction.
Figure 16B:
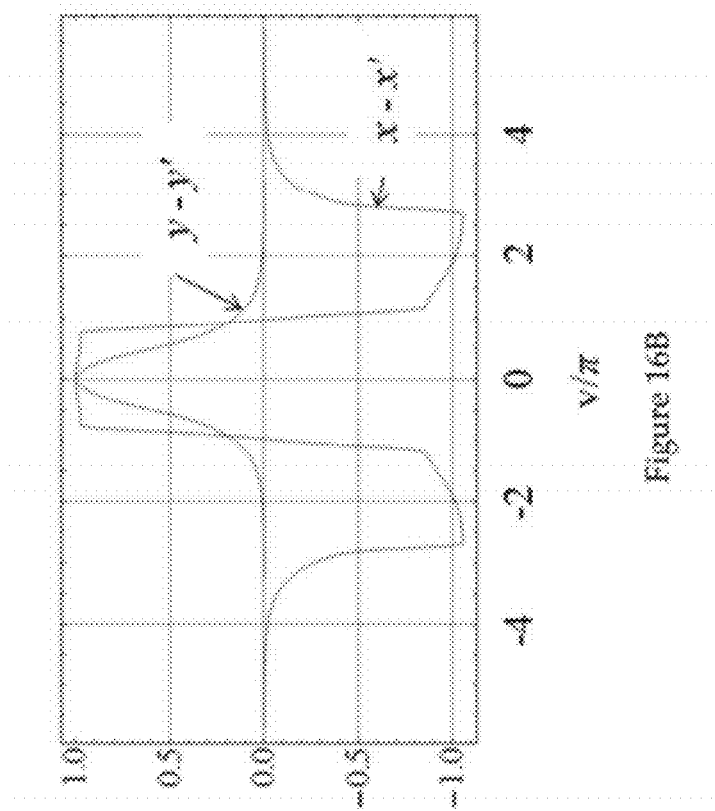
FIGS. 16A and 16B illustrate the field distribution of the waveguide's flattened mode.
Figure 16A:
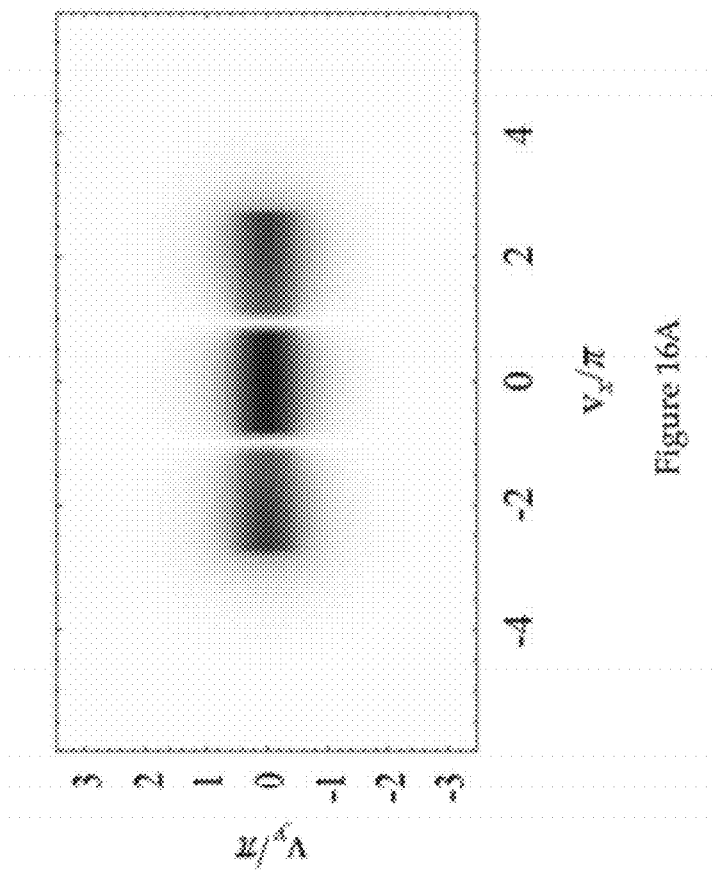

FIG. 14 illustrates the cross-section of a waveguide that supports a mode that is flattened in one direction. FIG. 15 illustrates the refractive index profiles along lines x-x' and y-y' of FIG. 14. Table 2 lists parameters for those profiles; in the table, $\Delta v$ refers to the normalized thickness of the layer. FIG. 16 illustrates the field distribution of that waveguide's flattened mode. The profiles were determined by applying the design rules for the one-dimensional slab-like waveguide. The effective index of the flattened mode is 0.6, substantially equal to the effective index of the field-flattening layers of 1.0; the small difference stems from the fact that the mode is only flattened in one direction.

TABLE 2

| | x-x' | | | | y-y' | | |
|---|---|---|---|---|---|---|---|
| layer | region type | $\Delta v_x/\pi$ | $\eta$ | layer | region type | $\Delta v_y/\pi$ | $\eta$ |
| i | terminating | 0.0996 | −10 | i | — | 0.9739 | 1 |
| ii | terminating | 0.0815 | 10 | | | | |
| iii | flattening | 1.4510 | 1 | | | | |
| iv | stitching | 0.0974 | 10 | | | | |
| v | stitching | 0.2381 | −10 | | | | |
| vi | stitching | 0.0974 | 10 | | | | |
| vii | flattening | 1.4510 | 1 | | | | |
| viii | stitching | 0.0974 | 10 | | | | |
| ix | stitching | 0.2381 | −10 | | | | |
| x | stitching | 0.0974 | 10 | | | | |
| xi | flattening | 1.4510 | 1 | | | | |
| xii | terminating | 0.0815 | 10 | | | | |
| xiii | terminating | 0.0996 | −10 | | | | |

Figure 17:
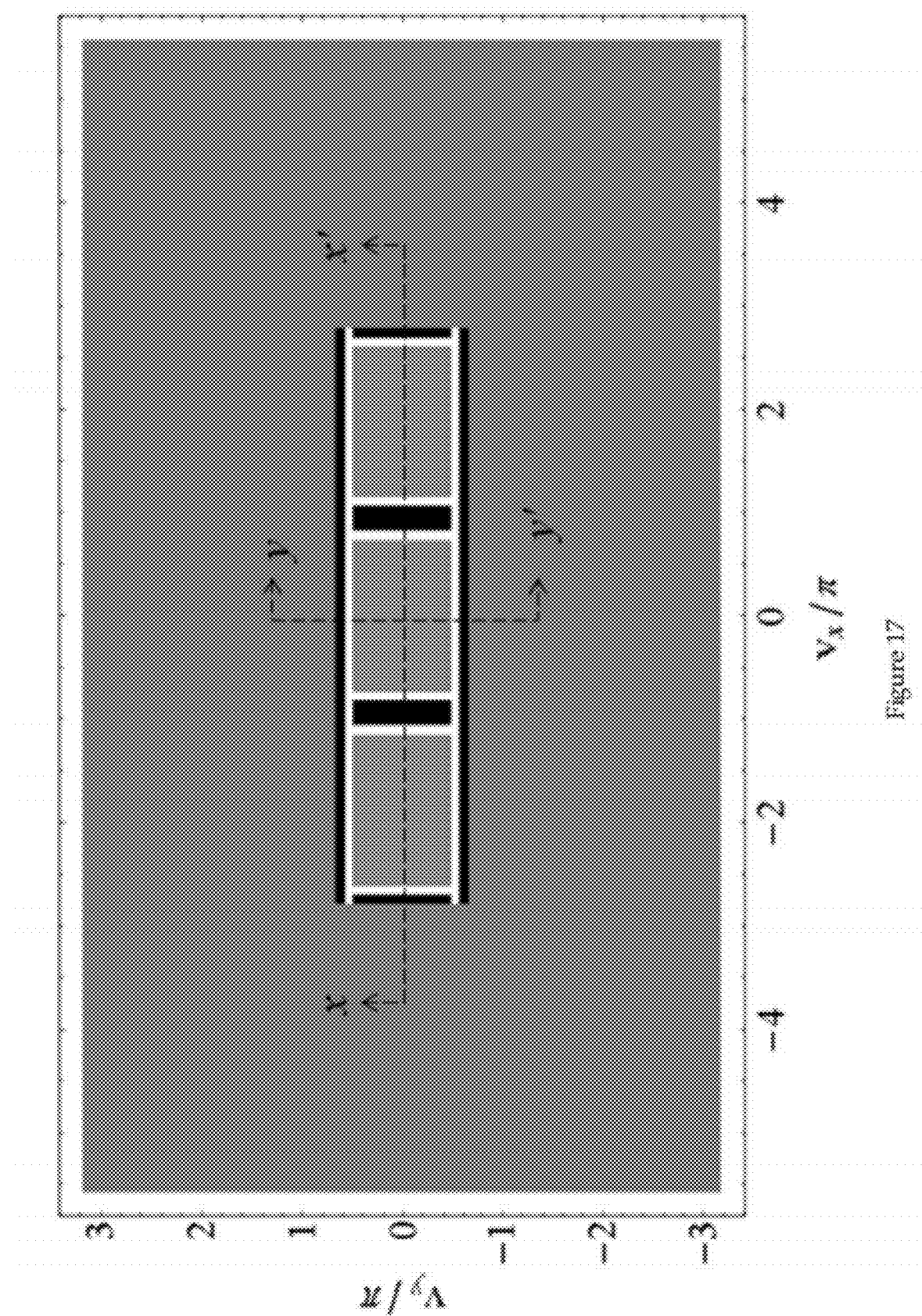
FIG. 17 illustrates the cross-section of a waveguide that supports a mode that is flattened in two directions.
Figures 19A, 19B:
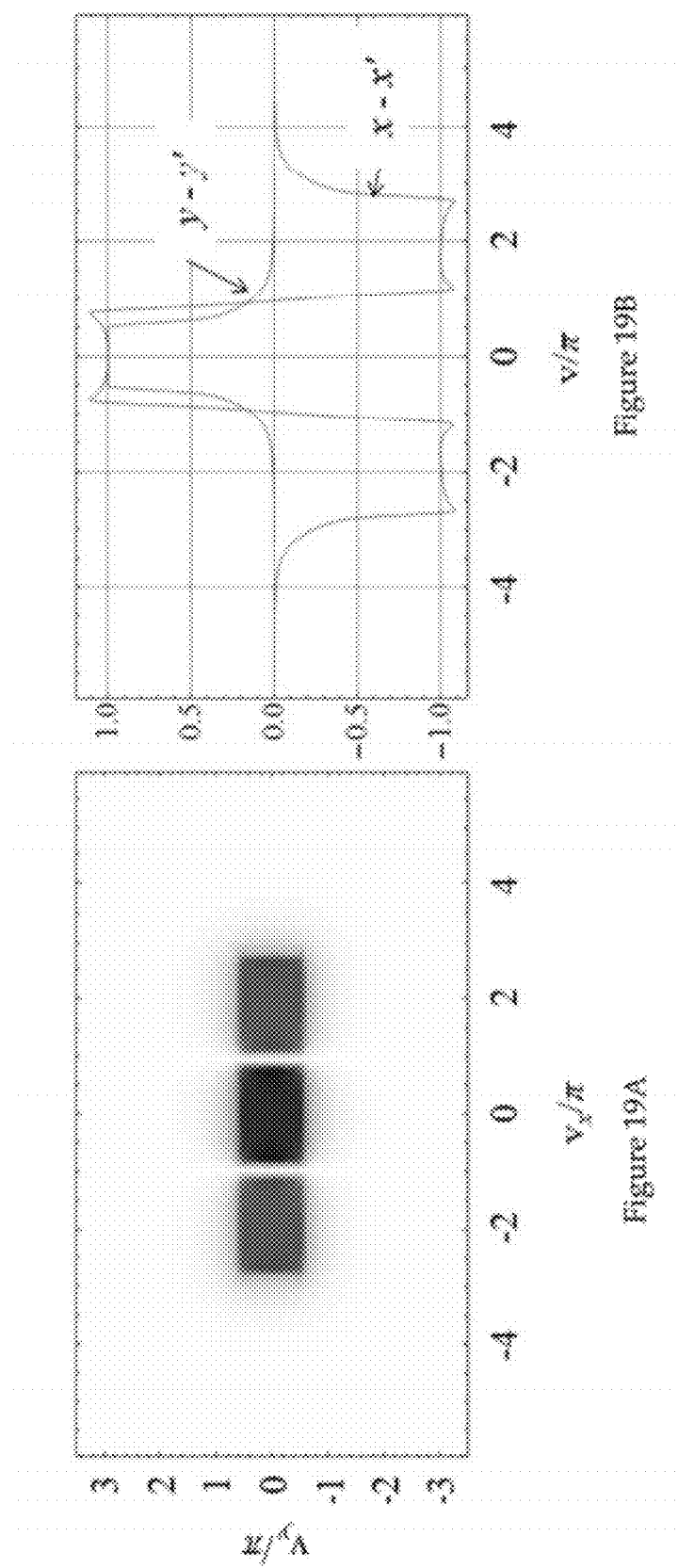
FIGS. 19A and 19B illustrate the field distribution of the waveguide's flattened mode.

FIG. 17 illustrates the cross-section of a waveguide that supports a mode that is flattened in two directions. FIG. 18 illustrates the refractive index profiles along lines x-x' and y-y' of FIG. 17. Table 3 lists parameters for those profiles; in the table, $\Delta V$ refers to the normalized thickness of the layer. FIG. 19 illustrates the field distribution of that waveguide's flattened mode. The profiles were determined by applying the design rules for the one-dimensional slab-like waveguide, then refining the design via computer modeling to further flatten the mode. The effective index of the flattened mode is 1.003, substantially equal to the effective index of the field-flattening layers of 1.0.

Elliptical, Hexagonal Waveguides

In some embodiments of the invention, the cross-section of the waveguide is substantially elliptical, and the cross-sections of the field-flattening regions are substantially elliptical or elliptical annular, and the cross-section of each of the layers of the stitching regions is substantially elliptical or elliptical annular. One or more terminating region include a single terminating region having a cross-section that is substantially elliptical annular. The cross-section of each layer the terminating region is substantially elliptical annular, where the centers of each elliptical or elliptical annular field-flattening region, of each elliptical or elliptical annular stitching region layer, and of each elliptical annular terminating region layer are substantially coincident. The axes of the elliptical or elliptical annulus regions or the elliptical or elliptical annulus layers are substantially parallel and the inner boundary of regions having elliptical annular cross-section is the inner ellipse of the elliptical annular region. The outer boundary of regions having elliptical annular cross-section is the outer ellipse of the elliptical annular region. The inner boundary of regions having elliptical cross-section is an ellipse having a cross-sectional area of zero and the outer boundary of regions having elliptical cross-section is the outer ellipse of the elliptical region.

In some embodiments of the invention, the cross-section of the waveguide is substantially hexagonal, and the cross-sections of the plurality of field-flattening regions are substantially hexagonal or hexagonal annular, and the cross-section of each of the layers of each of the stitching regions is substantially hexagonal or hexagonal annular. The one or more terminating region comprises a single terminating region. The cross-section of the one terminating region is substantially hexagonal annular, and the cross-section of each layer comprising the one terminating region is substantially hexagonal annular. The centers of each hexagonal or hexagonal annular field-flattening region, of each hexagonal or hexagonal annular stitching region layer, and of each hexagonal annular terminating region layer are substantially coincident, where the axes of the hexagonal or hexagonal annulus regions or the hexagonal or hexagonal annulus layers are substantially parallel and where the inner boundary of regions having hexagonal annular cross-section is the inner hexagon of the hexagonal annular region, the outer boundary of regions having hexagonal annular cross-section is the outer hexagon of the hexagonal annular region, the inner boundary of regions having hexagonal cross-section is a hexagon having a cross-sectional area of zero, and the outer boundary of regions having hexagonal cross-section is the outer hexagon of the hexagonal region.

Fabrication

A embodiment for fabricating the waveguide of the present invention includes depositing glass on the inside of a tube or the outside of a mandrel to produce the plurality of field-flattening regions, the one or more stitching regions, the one or more terminating regions and the cladding region, where the step of depositing glass utilizes chemical vapor deposition. The composition of the glass is varied at intervals during the chemical vapor deposition to form the field-flattening region refractive index structure, the stitching region refractive index structure, the terminating region refractive index structure and the cladding refractive index. The glass is consolidated the glass into a preform and the preform is drawn to a reduced cross-section.

Another embodiment for fabricating the waveguide of the present invention includes sheathing annular glass pieces to produce the plurality of field-flattening regions, the one or more stitching regions, the one or more terminating regions and the cladding region. The sizes, shapes, and refractive indices of the annular glass pieces are varied to form the field-flattening region refractive index structure, the stitching region refractive index structure, the terminating region refractive index structure and the cladding refractive index. The annular glass pieces are consolidated into a preform which is drawn to a reduced cross-section.

Another embodiment for fabricating the waveguide of the present invention includes arranging rectangular glass pieces side-by-side to produce the plurality of field-flattening regions, the one or more stitching regions, the one or more terminating regions and the cladding region. The sizes, refractive indices, and placement of the rectangular glass pieces are arranged to form the field-flattening region refractive index structure, the stitching region refractive index structure, the terminating region refractive index structure and the cladding refractive index. The set of the rectangular glass pieces are consolidated into a preform which is drawn to a reduced cross-section Another embodiment for fabricating the waveguide of the present invention includes arranging glass rods and glass capillaries into an array to produce the plurality of field-flattening regions, the one or more stitching regions, the one or more terminating regions and the cladding region. The sizes, shapes, refractive indices and placement of the glass rods and the glass capillaries are arranged within the array to produce the field-flattening region refractive index structure, the stitching region refractive index structure, the terminating region refractive index structure and the cladding refractive index. The set of the rectangular glass pieces are consolidated into a preform which is drawn to a reduced cross-section.

In some embodiments, the step of consolidating is carried out with a furnace or a torch and where the step of drawing is carried out with a furnace and a pulling apparatus.

APPENDIX I

Bessel Solutions

Consider the equation that governs the radially-varying portion of the field in an axially symmetric waveguide such as a conventional telecom optical fiber [9]:

$$\left\{\frac{\partial^2}{\partial r^2} + \frac{1}{r}\frac{\partial}{\partial r} - \frac{l^2}{r^2} + \left(\frac{2\pi}{\lambda}\right)^2 [n^2(r) - n_{eff}^2]\right\}\psi(r) = 0 \quad (9)$$

where $\psi$ represents the field of a guided mode, 1 is the azimuthal order, n(r) is the index at radial coordinate r, $n_{eff}$ is the effective index (propagation constant) of the mode, and $\lambda$ is the vacuum wavelength of the guided light. In the discussion that follows we assume that the radial index profile varies in discreet steps, or layers.

Define the dimensionless and scaled variables:

$$v = \frac{2\pi}{\lambda}r\sqrt{n_{flat}^2 - n_{clad}^2} \quad (10)$$

$$\eta = \frac{n^2(v) - n_{clad}^2}{n_{flat}^2 - n_{clad}^2} \quad (11)$$

and $$\eta_{eff} = \frac{n_{eff}^2 - n_{clad}^2}{n_{flat}^2 - n_{clad}^2} \quad (12)$$

where $n_{flat}$ is the refractive index of the layer or layers in which the field will ultimately be flattened (in the method prescribed in this paper, $n_{flat}$ is chosen before the waveguide is designed). In these terms the wave equation becomes:

$$\left\{\frac{\partial^2}{\partial v^2} + \frac{1}{v}\frac{\partial}{\partial v} - \frac{l^2}{v^2} + \eta(v) - \eta_{eff}\right\}\psi(v) = 0 \quad (13)$$

For weak waveguides, the field and its radial derivative are continuous across the step-like boundaries between layers. Since the radial derivative is continuous, so is the quantity:

$$\zeta = r\frac{\partial \psi}{\partial r} = v\frac{\partial \psi}{\partial v}. \quad (14)$$

To determine the field distribution of the modes of a complex waveguide, we track $\psi$ and $\zeta$; we begin by determining analytic solutions for the field in layers whose index is greater than, less than, and equal to the propagation constant. Each analytic solution has two unknown constants, which can be determined by the boundary conditions.

Begin by considering layers that are neither the inner-most layer, here referred to as the "core," nor the outermost layer, referred to as the "cladding." The cladding is presumed to extend to infinity.

In layers where $\eta > \eta_{eff}(n > n_{eff})$, the solution to the wave equation is:

$$\psi(x) = AJ_l(x) + BY_l(x)(n > n_{eff}) \quad (15)$$

where $J_l$ and $Y_l$ are oscillatory Bessel functions, A and B are unknown constants, and:

$$x = v\sqrt{|\eta - \eta_{eff}|} \quad (16)$$

If $\psi$ and $\zeta$ are known at some position $v_1$, such as at one of the layer's boundaries, then A and B can be expressed:

$$A = \frac{\pi}{2}[x_1 Y_l'(x_1)\psi_1 - Y_l(x_1)\zeta_1] \quad (17)$$

$$B = \frac{\pi}{2}[-x_1 J_l'(x_1)\psi_1 + J_l(x_1)\zeta_1] \quad (18)$$

A and B were determined with the help of the following Bessel identity [12]:

$$J_l(x) \cdot xY_l'(x) - xJ_l'(x) \cdot Y_l(x) = 2/\pi \quad (19)$$

Note that the derivatives of the Bessel functions can calculated exactly from the identities:

$$xJ_l'(x) = lJ_l(x) - xJ_{l+1}(x) \quad (20)$$

$$xY_l'(x) = lY_l(x) - xY_{l+1}(x) \quad (21)$$

In layers where $\eta < \eta_{eff}(n < n_{eff})$ the solution to the wave equation is:

$$\psi(x)=AI_1(x)+BK_1(x)(n<n_{\mathit{eff}})\qquad(22)$$

where $I_1$ and $K_1$ are exponentially growing and decaying modified Bessel functions and A and B are unknown constants. If $\psi$ and $\zeta$ are known at some position $v_1$, such as at one of the layer's boundaries, then A and B can be expressed:

$$A=-x_1K_1'(x_1)\psi_1+K_1(x_1)\zeta_1\qquad(23)$$

$$B=x_1I_1'(x_1)\psi_1-I_1(x_1)\zeta_1\qquad(24)$$

In determining A and B we used the Bessel identity:

$$K_1(x)\cdot xI_1'(x)-xK_1'(x)\cdot I_1(x)=1\qquad(25)$$

Note that the derivatives of the Bessel functions can be calculated exactly from the identities:

$$xI_1'(x)=lI_1(x)+xI_{1+1}(x)\qquad(26)$$

$$xK_1'(x)=lK_1(x)-xK_{1+1}(x)\qquad(27)$$

In layers where $\eta=n_{\mathit{eff}}$ ($n=n_{\mathit{eff}}$) the wave equation reduces to:

$$\left\{\frac{\partial^2}{\partial v^2}+\frac{1}{v}\frac{\partial}{\partial v}-\frac{l^2}{v^2}\right\}\psi(v)=0\qquad(28)$$

For $l\neq 0$ the solution is:

$$\psi=Av^{+l}+Bv^{-l}(n=n_{\mathit{eff}},l\neq 0)\qquad(29)$$

and the constants A and B become:

$$A=\frac{v_1^{-l}}{2l}(l\psi_1+\zeta_1)\qquad(30)$$

$$B=\frac{v_1^{l}}{2l}(l\psi_1-\zeta_1)\qquad(31)$$

For $l=0$ the solution is:

$$\psi=A+B\ln(v)(n=n_{\mathit{eff}},l=0)\qquad(32)$$

and the constants A and B become:

$$A=\psi_1-\zeta_1\ln(v_1)\qquad(33)$$

$$B=\zeta_1\qquad(34)$$

Note that in Eq. (32), the field can be made independent of position by forcing the constant B to zero (from Eq. (34), this is equivalent to making the field's slope zero); thus a necessary condition is that $n=n_{\mathit{eff}}$. Comparing Eq. (29) and Eq. (32) we see that the field can only be flattened if, in addition to $n=n_{\mathit{eff}}$, the azimuthal order, 1, is also zero.

Now consider the inner-most layer, the core, and the outer-most layer, the cladding. In these only a single Bessel solution is allowed. In the core the solutions are:

$$\psi=AJ_1(x)(\eta>\eta_{\mathit{eff}})\qquad(35)$$

$$\psi=AI_1(x)(\eta<\eta_{\mathit{eff}})\qquad(36)$$

$$\psi=Av^l(\eta=\eta_{\mathit{eff}},l\{\text{fourth root}\}0)(\eta=\eta_{\mathit{eff}},l\neq 0)\qquad(37)$$

$$\psi=A(\eta>\eta_{\mathit{eff}},l=0)\qquad(38)$$

and in the cladding the allowed solution is:

$$\psi=AK_1(x)\qquad(39)$$

APPENDIX II

Transfer Matrices

The solutions for the constants A and B can be substituted into the original expressions for $\psi$ and the corresponding expressions for $\zeta$ to obtain transfer matrices, M, that relate $\psi$ and $\zeta$ at position $v_2$ to their known values at position $v_1$:

$$\begin{bmatrix}\psi_2\\ \zeta_2\end{bmatrix}=M\begin{bmatrix}\psi_1\\ \zeta_2\end{bmatrix}\qquad(40)$$

In all cases, the matrices can be written in the form:

$$M=m^{-1}(x_2)m(x_1)\qquad(41)$$

where $x_1$ is the quantity x, defined by Eq. (16), evaluated at position $v_1$ and index $\eta_{12}$ (the index between $v_1$ and $v_2$), and $x_2$ is x evaluated at $v_2$ and index $\eta_{12}$.

The determinant of each matrix is unity, but they are not orthogonal. Their inverses are found by exchanging their diagonal elements and changing the signs of their off-diagonal elements.

In layers where $\eta>n_{\mathit{eff}}(n>n_{\mathit{eff}})$:

$$m(x)=\sqrt{\frac{\pi}{2}}\begin{bmatrix}xY_l'(x) & -Y_l(x)\\ -xJ_l'(x) & J_l(x)\end{bmatrix}\qquad(42)$$

In layers where $\eta<\eta_{\mathit{eff}}$:

$$m(x)=\begin{bmatrix}xI_l'(x) & -I_l(x)\\ -xK_l'(x) & K_l(x)\end{bmatrix}\qquad(43)$$

In layers where $\eta=\eta_{\mathit{eff}}$ and $l\neq 0$:

$$m(x)=\frac{1}{\sqrt{2}}\begin{bmatrix}v^{-l} & 1/v^l\\ -lv^l & v^l\end{bmatrix}\qquad(44)$$

In layers where $\eta=\eta_{\mathit{eff}}$ and $l=0$:

$$m(x)=\begin{bmatrix}1 & -\ln(v)\\ 0 & 1\end{bmatrix}\qquad(45)$$

The transfer matrix solution to the wave equation for a step-like fiber then becomes:

$$M\begin{bmatrix}1\\ \Omega_{\mathit{core}}\end{bmatrix}=(\mathit{const})\begin{bmatrix}1\\ \Omega_{\mathit{clad}}\end{bmatrix}\qquad(46)$$

where the quantity $\Omega$ is defined as:

$$\Omega=\zeta/\psi\qquad(47)$$

and $\Omega_{\mathit{clad}}$ is (from Eq. (39)):

$$\Omega_{clad} = \left.\frac{xK'_l(x)}{K_l(x)}\right|_{x=x_{clad}} \quad (48)$$

where $x_{clad}$ is the term x; as defined by Eq. (16), evaluated at position $v_{clad}$ and index $\eta_{clad}=0$. Note that the Bessel derivates can be calculated from Eq. (27). $\Omega_{core}$ is similarly calculated from Eq. (35), Eq. (36), Eq. (37), or Eq. (38) at the core's boundary.

The matrix M is the product of the matrices that represent the layers between the core and cladding; it takes advantage of the fact that $\psi$ and $\zeta$ are continuous across layer boundaries. For a given waveguide, the propagation constant $\eta_{eff}$ is determined iteratively—that is, by varying its value until the transfer matrix solution is satisfied.

In the above, (const) refers to a multiplicative constant related to the total power carried by a mode, as discussed in the following Appendix.

APPENDIX III

Mode Normalization

This appendix gives closed-form solutions for the mode normalization integral, and defines scaled fields.

Mode normalization involves choosing the (const) term of Eq. (46) to make the power carried by a mode equal to some preselected value, $P_0$:

$$2\pi(const)^2 \int_0^\infty \psi^2 r dr = P_0 \quad (49)$$

Define $\psi_{scaled}$ such that:

$$\psi^2 = \left(\frac{2\pi}{\lambda}\right)^2 (n_{flat}^2 - n_{clad}^2) P_0 \psi_{scaled}^2 \quad (50)$$

Then normalization reduces to setting:

$$2\pi(const)^2 \int_0^\infty \psi_{scaled}^2 v dv = 1 \quad (51)$$

The integration is typically performed numerically, though with the expressions that follow, which we believe are novel, it can be calculated analytically. The solutions were obtained by integrating the above expression by parts twice and taking advantage of the fact that the bound modes' fields satisfy the original wave equation, Eq. (13).

For $\eta \neq \eta_{eff} (n \neq n_{eff})$:

$$2\pi \int \psi^2 v dv = \pi \frac{\zeta^2 - l^2 \psi^2}{\eta - \eta_{eff}} + \pi v^2 \psi^2 \quad (52)$$

For $\eta = \eta_{eff}$ and $l = 0$:

$$2\pi \int \psi^2 v dv = \frac{\pi v^2}{2}(\zeta^2 - 2\psi\zeta) + \pi v^2 \psi^2 \quad (53)$$

For $\eta = \eta_{eff}$ and $l = 1$:

-continued $$2\pi \int \psi^2 v dv = \quad (54)$$
$$\pi \left(\frac{v}{2}\right)^2 \left[\frac{1}{2}(\zeta + \psi)^2 + 2(\zeta - \psi)^2 \ln(v) - 2(\zeta^2 + \psi^2)\right] + \pi v^2 \psi^2$$

And finally, for $\eta = \eta_{eff}$ and $l \geq 2$:

$$2\pi \int \psi^2 v dv = \quad (55)$$
$$\pi \left(\frac{v}{2l}\right)^2 \left[\frac{1}{l+1}(\zeta + l\psi)^2 - \frac{1}{l-1}(\zeta - l\psi)^2 - 2(\zeta^2 + l^2\psi^2)\right] + \pi v^2 \psi^2$$

These are the indefinite solutions to the integrals; the contribution from an individual layer is found by evaluating its solution (depending on its index relative to the propagation constant) at the its boundaries, and subtracting one from the other. The full integral (from zero to infinity) is found by summing the individual contributions. Note that, for any waveguide design, the right-most terms of the piece-wise integrals contributes the following series to the full integral:

$$\pi[v^2\psi^2]_0^{r_1} + \pi[v^2\psi^2]_{r_1}^{r_2} + \ldots + \pi[v^2\psi^2]_{r_{clad}}^r \quad (56)$$

However, since $v$ and $\psi$ are continuous across interfaces, this reduces to $\pi[v^2\psi^2]_0^{r_1}$, which is zero for all bound modes. Thus, while the right-most terms contribute to the piece-wise integrals, they do not contribute to the full integral.

The closed form solutions can also be used to quickly calculate the group index of a mode via Eq. (60).

APPENDIX IV

Size-Spacing Products

This appendix defines several mode size-spacing products and shows that for a given waveguide design, these are fixed. It refers to scaled teems defined in Appendix 1. Once the scaled index profile (Eq. (11)) is specified, the scaled propagation constants, Eq. (12), and the shapes of the allowed modes are completely determined, as implied by the form of the scaled wave equation, Eq. (13). To relate scaled quantities to those that can be measured in a laboratory, begin by noting that the effective mode area can be written:

$$A_{eff} = 2\pi \frac{\left(\int \psi^2 r dr\right)^2}{\int \psi^4 r dr} = \frac{(\lambda/2\pi)^2}{n_{flat}^2 - n_{clad}^2} A_{eff}^{scaled} \quad (57)$$

where the scaled effective area is defined as:

$$A_{eff}^{scaled} = 2\pi \frac{\left(\int \psi^2 v dv\right)^2}{\int \psi^4 v dv} \quad (58)$$

For each allowed mode of a design, the propagation constant and scaled area are fixed, and thus their product, represented here by the symbol $\Theta_{eff}$, is also fixed:

$$\Theta_{eff} = \eta_{eff} A_{eff}^{scaled} = \frac{A_{eff}}{\lambda^2}(n_{eff}^2 - n_{clad}^2) \quad (59)$$

The right-most term is found through substitution; note that though it was derived from scaling arguments, it consists only of quantities that can be directly measured, and that since $\Theta_{eff}$ is fixed, if a mode's size is increased, its effective index necessarily approaches the cladding index. Since this holds for all modes, it follows that as a desired mode's size is increased, the effective indices of all modes necessarily approach each other.

The effective index is the phase index of the mode. When evaluating pulse propagation effects, the group index, $n_g$, is also important. Using an integral form of the group index [13] it can be shown that:

$$\frac{n_{eff}n_g - n_{clad}^2}{n_{flat}^2 - n_{clad}^2} = \frac{\int \eta \psi^2 dv}{\int \psi^2 dv} \quad (60)$$

and following arguments similar to those that led to $\Theta_{eff}$ it can be shown that the following quantity is also fixed for each mode of a waveguide:

$$\Theta_{eff,g} = \frac{A_{eff}}{\lambda^2}(n_{eff}n_g - n_{clad}^2) \quad (61)$$

where $n_{eff}n_g$ is the product of a mode's phase and group indices. Like $\Theta_{eff}$, this is a strict invariant of a design (within the strictures of the weak-guiding approximation), but unfortunately the separations between the $\Theta_{eff,g}$'s are not obvious indicators of the separations between the group indices. The following term is more transparent:

$$\Theta_g = \frac{A_{eff}}{\lambda^2}(n_g^2 - n_{clad}^2) = 2\Theta_{eff,g} - \Theta_{eff} + \frac{\lambda^2}{n_{eff}^2 A_{eff}}(\Theta_{eff,g} - \Theta_{eff})^2 \quad (62)$$

where the right hand side has been found by substitution. Since $\Theta_g$ depends on $A_{eff}$ it is not a true invariant of the guide. However, if the mode's area is sufficiently large the term containing $A_{eff}$ can be neglected, usually justified for guides designed for high power laser applications, so that $\Theta_g$ may be considered, to a good approximation, invariant.

REFERENCES

1. J. Fini and S. Ramachandran, "Natural bend-distortion immunity of higher-order-mode large-mode-area fibers," Opt. Lett. 32, 748-750 (2007).
2. S. Ramachandran, J. M. Fini, M. Mermelstein, J. W. Nicholson, S. Ghalmi, and M. F. Yan, "Ultra-large effective-area, higher-order mode fibers: a new strategy for high-power lasers," Laser Photonics Rev. 2, 429 (2008).
3. R. H. Stolen and C. Lin, "Self-phase-modulation in silica optical fibers," Phys. Rev. A 17, 1448 (1978).
4. A. K. Ghatak, I. C. Goyal, R. Jindal, "Design of waveguide refractive index profile to obtain flat modal field" SPIE Proceedings vol. 3666, pp. 40 (1998).
5. J. Dawson, R. Beach, I. Jovanovic, B. Wattellier, Z. Liao, S. Payne, and C. Barty, "Large flattened-mode optical fiber for reduction of nonlinear effects in optical fiber lasers," Proc. SPIE 5335, 132 (2004).
6. W. Torruellas, Y. Chen, B. McIntosh, J. Farroni, K. Tankala, S. Webster, D. Hagan, M. J. Soileau, M. Messerly, and J. Dawson, "High peak power Ytterbium doped fiber amplifiers," Proc. SPIE, 6102, 61020-1-61020-7 (2006).
7. B. Ward, C. Robin, and M. Culpepper, "Photonic crystal fiber designs for power scaling of single-polarization amplifiers" Proc. SPIE 6453, 645307 (2007).
8. C. Zhao, Z. Tang, Y. Ye, L. Shen, D. Fan, "Design guidelines and characteristics for a kind of four-layer large flattened mode fibers," Optik—International Journal for Light and Electron Optics, 119, 749-754 (2008).
9. A. Yariv, Optical Electronics, $3^{rd}$ Edition, (Holt, Rinehart and Winston, 1985).
10. P. Yeh, "Optical Waves in Layered Media. Wiley-Interscience, Hoboken N.J. (1998).
11. P. Yeh, A. Yariv, and C. S. Hong, "Electromagnetic propagation in periodic stratified media, I. General theory," J. Opt. Soc. Am. 67:423-438 (1977).
12. M. Abramowitz and I. Stegun, Handbook of Mathematical Functions (Dover, 1972).
13. A. W. Snyder and J. D. Love, Optical Waveguide Theory p. 644 (Chapman and Hall Ltd, 1983).

The above references, 1-13, are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A waveguide for guiding a field-flattening preferred mode at a preferred mode effective index, comprising:
   a plurality of field-flattening regions, wherein each field-flattening region of said plurality of field-flattening regions comprises a field-flattening region inner boundary, a field-flattening region outer boundary and a field-flattening region refractive index, wherein said field-flattening region refractive index does not vary substantially within said each field-flattening region of said plurality of field-flattening regions, and said field-flattening region refractive index is substantially equal to a preferred mode effective index, to thus induce the field associated with the field-flattening preferred mode to not vary substantially with position within said each field-flattening region;
   one or more stitching regions, wherein a stitching region of said one or more stitching regions is located between neighboring said each field-flattening region, wherein each said stitching region comprises a stitching region inner boundary, a stitching region outer boundary, and a stitching region refractive index structure, wherein said stitching region refractive index structure comprises means for inducing the field of said preferred mode to vary substantially with position within said stitching region and means for inducing the gradient of the field of said field-flattening preferred mode to be zero or nearly zero at said stitching region inner boundary and at said stitching region outer boundary;

one or more terminating regions, wherein each terminating region of said one or more terminating regions comprises a terminating region inner boundary, a terminating region outer boundary, and a terminating region refractive index structure, wherein said terminating region inner boundary is in contact with one said field-flattening region outer boundary; and a cladding region comprising a cladding region inner boundary and a substantially homogeneous cladding refractive index, wherein said cladding region surrounds all said plurality of field-flattening regions, surrounds all said one or more stitching regions, and surrounds all said one or more terminating regions, wherein said cladding region inner boundary is in contact with said terminating region outer boundary of all of said one or more terminating regions, wherein each said terminating region refractive index structure of said one or more terminating regions comprises means for inducing the field of said field-flattening preferred mode to transition from the field at said terminating region inner boundary to a decaying field in said cladding region.

2. The waveguide of claim 1, wherein each stitching region of said one or more stitching regions comprises one or more stitching region layers, wherein each said stitching region layer of said one or more stitching region layers comprises a stitching region layer inner boundary, a stitching region layer outer boundary, and a substantially homogeneous stitching layer refractive index and wherein said each terminating region comprises one or more terminating region layers, wherein each terminating region layer of said one or more terminating region layers comprises a terminating region layer inner boundary, a terminating region layer outer boundary, and a substantially homogeneous terminating region refractive index.

3. The waveguide of claim 1, wherein each stitching region of said one or more stitching regions comprises one or more stitching region layers, wherein each said stitching region layer of said one or more stitching region layers comprises a stitching region layer inner boundary and a stitching region layer outer boundary and wherein said each terminating region comprises one or more terminating region layers, wherein each terminating region layer of said terminating region layers comprises a terminating region layer inner boundary and a terminating region layer outer boundary, wherein within said each stitching region layer and within said each terminating region layer the refractive index may vary with position.

4. The waveguide of claim 2, wherein one or more of said one or more stitching regions comprises a single stitching layer having a said substantially homogeneous stitching layer refractive index that is greater than said preferred mode effective index, and the position of said stitching layer inner boundary, the position of said stitching layer outer boundary, and said substantially homogeneous stitching layer refractive index together are configured to induce the field of said preferred mode to change polarity one or more times within said single stitching layer.

5. The waveguide of claim 2, wherein one or more of said one or more stitching regions comprises at least two stitching region layers, wherein each stitching region layer of said at least two stitching region layers comprises a said substantially homogeneous stitching layer refractive index that is greater than said preferred mode effective index and wherein the position of said stitching layer inner boundary, the position of said stitching layer outer boundary, and said substantially homogenous stitching layer refractive index of each of said at least two stitching region layers together are configured to induce the field of said preferred mode to change polarity one or more times within said at least two stitching region layers, and together are further configured to induce the magnitude of the field at said stitching region inner boundary, and the magnitude of the field at said stitching region outer boundary, to be substantially equal.

6. The waveguide of claim 2, wherein one or more of said one or more stitching regions comprises at least two stitching region layers, wherein each stitching region layer of said at least two stitching region layers comprises said substantially homogeneous stitching layer refractive index that is greater than said preferred mode effective index and wherein the position of said stitching layer inner boundary, the position of said stitching layer outer boundary, and said substantially homogenous stitching layer refractive index of said each stitching layer together are configured to induce the magnitude of the field at said stitching region inner boundary, and the magnitude of the field at said stitching region outer boundary, to differ by a ratio greater than 1.4 or to differ by a ratio less than 0.7.

7. The waveguide of claim 6, further comprising a gain medium in one or more field-flattening regions having a larger field-flattening region than other field-flattening regions within said waveguide.

8. The waveguide of claim 6, further comprising a lossy medium, such as a stress applying material, in one or more field-flattening regions having a smaller field-flattening region than other field-flattening regions within said waveguide.

9. The waveguide of claim 2, wherein one or more of said one or more stitching regions comprises at least two stitching region layers and wherein the position of said stitching layer inner boundary, the position of said stitching layer outer boundary, and said substantially homogenous stitching layer refractive index of each of said at least two stitching region layers together are configured to induce the field of said preferred mode to be substantially zero at the interface between one or more pairs of adjacent layers in said at least two stitching region layers.

10. The waveguide of claim 2, wherein one or more of said one or more stitching regions is comprised of three or more layers, two or more of said three or more layers having a said substantially homogeneous refractive index that is greater than said preferred mode effective index and one or more of said three or more layers having a said substantially homogeneous refractive index less than said preferred mode effective index, and wherein the position of said inner boundary, the position of said outer boundary, and said substantially homogenous index of each of said three or more layers together comprise means for inducing the field of said preferred mode to change polarity within at least one of said one or more layers of said three or more layers having a said substantially homogeneous refractive index less than said preferred mode effective index.

11. The waveguide of claim 2 or 3, wherein the cross-section of said waveguide is substantially elliptical, and the cross-sections of said plurality of field-flattening regions are substantially elliptical or elliptical annular, and the cross-section of each of said layers of each of said stitching regions is substantially elliptical or elliptical annular, wherein said one or more terminating region comprises a single terminating region, wherein the cross-section of said one terminating region is substantially elliptical annular, and the cross-section of each layer comprising said one terminating region is substantially elliptical annular, wherein the centers of each elliptical or elliptical annular field-flattening region, of each elliptical or elliptical annular stitching region layer, and of each elliptical annular terminating region layer are substantially coincident, wherein the axes of said elliptical or elliptical annulus regions or said elliptical or elliptical annulus layers are substantially parallel and wherein said inner boundary of regions having elliptical annular cross-section is the inner ellipse of the elliptical annular region, said outer boundary of regions having elliptical annular cross-section is the outer ellipse of the elliptical annular region, said inner boundary of regions having elliptical cross-section is an ellipse having a cross-sectional area of zero, and said outer boundary of regions having: elliptical cross-section is the outer ellipse of the elliptical region.

12. The waveguide of claim 2, wherein one or more of said one or more terminating regions is comprised of one or more layers and wherein the position of said inner boundary, the position of said outer boundary, and said substantially homogenous index of each of said one or more layers together are configured to induce the field of said preferred mode to not change polarity within said one or more terminating regions.

13. The waveguide of claim 2, wherein one or more of said one or more terminating regions is comprised of one or more layers and wherein the position of said inner boundary, the position of said outer boundary and said substantially homogenous index of each of said one or more layers together are configured to induce the field of said preferred mode to change polarity one or more times within said one or more terminating region.

14. The waveguide of claim 2, wherein one or more of said one or more terminating regions comprised of two or more layers and wherein the position of said inner boundary, the position of said outer boundary and said substantially homogenous index of each of said two or more layers together are configured to induce the field of said preferred mode to be substantially zero at the interface between one or more pairs of adjacent layers in said one or more terminating regions comprised of two or more layers.

15. The waveguide of claim 2, wherein one or more of said one or more terminating regions is comprised of three or more layers, two or more of said three or more layers having a said substantially homogeneous refractive index that is greater than said preferred mode effective index and one or more of said three or more layers having a said substantially homogeneous refractive index that is less than said preferred mode effective index and wherein the position of said inner boundary, the position of said outer boundary, and said substantially homogenous index of each of said one or more layers together are configured to induce the field of said preferred mode to change polarity within at least one of said one or more layers of said three or more layers having a said substantially homogeneous refractive index less than said preferred mode effective index.

16. The waveguide of claim 2 or 3, wherein the cross-section of said waveguide is substantially hexagonal, and the cross-sections of said plurality of field-flattening regions are substantially hexagonal or hexagonal annular, and the cross-section of each of said layers of each of said stitching regions is substantially hexagonal or hexagonal annular, wherein said one or more terminating region comprises a single terminating region, wherein the cross-section of said one terminating region is substantially hexagonal annular, and the cross-section of each layer comprising said one terminating region is substantially hexagonal annular, wherein the centers of each hexagonal or hexagonal annular field-flattening region, of each hexagonal or hexagonal annular stitching region layer, and of each hexagonal annular terminating region layer are substantially coincident, wherein the axes of said hexagonal or hexagonal annulus regions or said hexagonal or hexagonal annulus layers are substantially parallel and wherein said inner boundary of regions having hexagonal annular cross-section is the inner hexagon of the hexagonal annular region, said outer boundary of regions having hexagonal annular cross-section is the outer hexagon of the hexagonal annular region, said inner boundary of regions having hexagonal cross-section is a hexagon having a cross-sectional area of zero, and said outer boundary of regions having hexagonal cross-section is the outer hexagon of the hexagonal region.

17. The waveguide of claim 2 or 3, wherein the cross-section of said waveguide is substantially circular, and the cross-sections of said plurality of field-flattening regions are substantially circular or circular annular, and the cross-section of each of said layers of each of said stitching regions is substantially circular or circular annular, and wherein said one or more terminating region comprises a single terminating region, wherein the cross-section of said one or more terminating region is substantially circular annular, and the cross-section of each layer comprising said one or more terminating region is substantially circular annular, wherein the centers of each circular or circular annular field-flattening region, of each circular or circular annular stitching region layer, and of each circular annular terminating region layer are substantially coincident and wherein said inner boundary of regions having circular annular cross-section is the inner circle of the circular annular region, said outer boundary of regions having circular annular cross-section is the outer circle of the circular annular region, said inner boundary of regions having a circular cross-section is a circle having radius of zero length, and said outer boundary of regions having a circular cross-section is the outer circle of the circular region.

18. The waveguide of claim 2 or 3, wherein the cross-section of said waveguide is substantially rectangular, and the cross-sections of said plurality of field-flattening regions, of each said one or more stitching region layers, and of each said one or more terminating region layers are substantially rectangular, and
    a side of each said field-flattening region, a side of each said stitching region layer, and a side of each said terminating region layer are substantially parallel to each other, wherein said inner boundary of each said substantially rectangular layer is one of the longer sides of said substantially rectangular layer, and said outer boundary of each said substantially rectangular layer is the side opposite the side chosen as the inner boundary of said substantially rectangular layer and wherein said one of said one or more stitching regions or one of said one or more terminating regions substantially bound each rectangular field-flattening region on at least two sides of said rectangular field-flattening region.

19. The waveguide of claim 1, wherein the area-weighted average refractive index of one or more of said one or more stitching regions is less than the average of said preferred mode of index and the maximum refractive index of all layers and regions comprising said waveguide, and is greater than the average of said preferred mode effective index and the minimum refractive index of all layers and regions comprising said waveguide.

20. The waveguide of claim 1, wherein the area-weighted average refractive index of one or more of said one or more terminating regions is less than the average of said preferred mode effective index and the maximum refractive index of all layers and regions comprising said waveguide, and is greater than the average of said preferred mode effective index and the minimum refractive index of all layers and regions comprising said waveguide.

21. A method for fabricating the waveguide of claim 1, comprising:
- depositing glass on the inside of a tube or the outside of a mandrel to produce said plurality of field-flattening regions, said one or more stitching regions, said one or more terminating regions and said cladding region, wherein the step of depositing glass utilizes chemical vapor deposition;
- varying the composition of said glass at intervals during said chemical vapor deposition to form said field-flattening region refractive index structure, said stitching region refractive index structure, said terminating region refractive index structure and said cladding refractive index;
- consolidating said glass into a preform; and
- drawing said preform to a reduced cross-section.

22. A method for fabricating the waveguide of claim 1, comprising:
- sheathing annular glass pieces to produce said plurality of field-flattening regions, said one or more stitching regions, said one or more terminating regions and said cladding region;
- varying the sizes, shapes, and refractive indices of said annular glass pieces to form said field-flattening region refractive index structure, said stitching region refractive index structure, said terminating region refractive index structure and said cladding refractive index;
- consolidating said annular glass pieces into a preform; and
- drawing said preform to a reduced cross-section.

23. A method for fabricating the waveguide of claim 1, comprising:
- arranging rectangular glass pieces side-by-side to produce said plurality of field-flattening regions, said one or more stitching regions, said one or more terminating regions and said cladding region;
- arranging sizes, refractive indices, and placement of said rectangular glass pieces to form said field-flattening region refractive index structure, said stitching region refractive index structure, said terminating region refractive index structure and said cladding refractive index;
- consolidating the set of said rectangular glass pieces into a preform; and
- drawing said preform to a reduced cross-section.

24. A method for fabricating the waveguide of claim 1, comprising:
- arranging glass rods and glass capillaries into an array to produce said plurality of field-flattening regions, said one or more stitching regions, said one or more terminating regions and said cladding region;
- arranging the sizes, shapes, refractive indices and placement of said glass rods and said glass capillaries within said array to produce said field-flattening region refractive index structure, said stitching region refractive index structure, said terminating region refractive index structure and said cladding refractive index;
- consolidating the set of said rectangular glass pieces into a preform; and
- drawing said preform to a reduced cross-section.

25. A method as in any one of claims 21-24, wherein the step of consolidating is carried out with a furnace or a torch and wherein the step of drawing is carried out with a furnace and a pulling apparatus.

26. A waveguide, comprising:
- a plurality of field-flattening regions, wherein each field-flattening region of said plurality of field-flattening regions comprises a field-fattening region refractive index that does not vary substantially within said each field-flattening region;
- one or more stitching regions, wherein a stitching region of said one or more stitching regions is located between neighboring said each field-flattening region, wherein each said stitching region comprises a stitching region refractive index structure configured to induce the field of a mode to vary substantially with position within said stitching region;
- one or more terminating regions, wherein each terminating region of said one or more terminating regions comprises a terminating region refractive index structure, wherein said each terminating region is in contact with one said field-flattening region; and
- a cladding region comprising a substantially homogeneous cladding refractive index, wherein said cladding region is in contact with a terminating region of said one or more terminating regions.

* * * * *